(12) United States Patent
Horiguchi et al.

(10) Patent No.: US 7,787,091 B2
(45) Date of Patent: Aug. 31, 2010

(54) TRANSVERSE FIELD TYPE LIQUID CRYSTAL DISPLAY PANEL

(75) Inventors: Masahiro Horiguchi, Tottori (JP); Hideki Kaneko, Tottori (JP); Hidetoshi Murai, Yokohama (JP); Hayato Kurasawa, Matsumoto (JP); Yasuo Segawa, Gifu-ken (JP)

(73) Assignee: Sony Corporation, Tokyo (JP)

( * ) Notice: Subject to any disclaimer, the term of this patent is extended or adjusted under 35 U.S.C. 154(b) by 252 days.

(21) Appl. No.: 11/835,734

(22) Filed: Aug. 8, 2007

(65) Prior Publication Data

US 2008/0284962 A1 Nov. 20, 2008

(30) Foreign Application Priority Data

Aug. 9, 2006 (JP) .............................. 2006-216510
Aug. 11, 2006 (JP) .............................. 2006-219334

(51) Int. Cl.
*G02F 1/1343* (2006.01)

(52) U.S. Cl. ....................................... 349/141; 349/139

(58) Field of Classification Search .................. 349/141
See application file for complete search history.

(56) References Cited

U.S. PATENT DOCUMENTS

| 6,466,289 | B1 * | 10/2002 | Lee et al. .................... 349/141 |
| 6,784,964 | B2 | 8/2004 | Nakayoshi et al. |
| 6,950,165 | B2 | 9/2005 | Matsumoto et al. |
| 7,084,948 | B2 | 8/2006 | Nakayoshi et al. |
| 7,453,540 | B2 | 11/2008 | Nakayoshi et al. |
| 7,557,886 | B2 | 7/2009 | Lee et al. |
| 2003/0020862 | A1 | 1/2003 | Ohta et al. |
| 2005/0190316 | A1 * | 9/2005 | Takahashi et al. ............. 349/44 |
| 2006/0146255 | A1 * | 7/2006 | Ahn ........................ 349/141 |
| 2006/0290867 | A1 * | 12/2006 | Ahn et al. ................... 349/141 |
| 2007/0046883 | A1 * | 3/2007 | Shimizu et al. ............. 349/141 |

FOREIGN PATENT DOCUMENTS

| CN | 1661449 A | 8/2005 |
| JP | 09-160075 A | 6/1997 |
| JP | 10319371 A | 12/1998 |
| JP | 2001-183699 A | 7/2001 |

(Continued)

OTHER PUBLICATIONS

Japanese Office Action dated Jul. 28, 2009, issued in corresponding Japanese patent application No. 2006-219334.

*Primary Examiner*—David Nelms
*Assistant Examiner*—Thanh-Nhan P Nguyen
(74) *Attorney, Agent, or Firm*—K&L Gates LLP

(57) ABSTRACT

A transverse field type liquid crystal display panel has multiple scan lines 12 and common wires 13 provided in parallel, multiple signal lines 17 provided in the direction crossing the scan lines 12, and common electrodes 14 and pixel electrodes 21 formed in the regions delimited by the multiple scan lines 12 and signal lines 17. At least part of the surface of an insulator laid over the scan lines 17 is covered by shield electrodes 22 constituted of a conductive material. Thanks to such structure, there can be provided a transverse field type—that is, an IPS mode or FFS mode—liquid crystal display panel that is equipped with a device for preventing burn-in due to the voltage that is applied to the scan lines.

15 Claims, 20 Drawing Sheets

FOREIGN PATENT DOCUMENTS

| | | |
|---|---|---|
| JP | 2002014363 A | 1/2002 |
| JP | 2002131767 A | 5/2002 |
| JP | 2002244158 A | 8/2002 |
| JP | 2003-195330 A | 7/2003 |
| JP | 2003-295207 A | 10/2003 |
| JP | 2005148534 A | 6/2005 |
| JP | 2005148602 A | 6/2005 |
| JP | 2005-241923 A | 9/2005 |
| JP | 2006-18287 A | 1/2006 |
| KR | 1997-0022458 A | 5/1997 |
| KR | 1020020088452 A | 11/2002 |
| KR | 1020030048653 A | 6/2003 |
| KR | 1020030078795 A | 10/2003 |
| KR | 1020030095257 A | 12/2003 |

* cited by examiner

TRANSVERSE FIELD TYPE LIQUID CRYSTAL DISPLAY PANEL

BACKGROUND

1. Technical Field

The present invention relates to an in-plane switching (IPS) mode or fringe field switching (FFS) mode transverse field type liquid display panel, and more particularly to an IPS or FFS mode liquid crystal display panel that is equipped with a device for preventing burn-in arising from the voltage that is applied to the scan lines.

2. Related Art

Recent years have seen widespread use of liquid crystal display panels not only in telecommunications equipment but in electrical equipment in general. The liquid crystal display panels that have long been in use are made up of a pair of substrates of glass or the like with electrodes and so on formed on their surfaces, and a liquid crystal layer formed between such pair of substrates. Images of various types are displayed by the application of voltage to the electrodes on the two substrates, which rearranges the liquid crystals, altering the transmittance of light therethrough. This is what may be called the "longitudinal field type". Among such longitudinal field type liquid crystal display panels there exist those with a twisted nematic (TM) mode or vertical alignment (VA) mode, which however have the problem that their viewing angle is narrow. Accordingly, longitudinal field type liquid crystal display panels with various improvements such as multidomain vertical alignment (MVA) mode have been developed.

On the other hand, among IPS mode liquid crystal display panels there are also known those that may be called "transverse field type" and that differ from the longitudinal field type described above in having electrodes on one substrate only (see JP-A-10-319371 and JP-A-2002-131767). The operating principles of such an IPS mode liquid crystal display panel will now be described using FIGS. 10 to 12. FIG. 10 is a schematic plan view of a single pixel portion of an IPS mode liquid crystal display panel, FIG. 11 is a cross-sectional view along line X-X in FIG. 10, and FIG. 12 is a cross-sectional view along line XI-XI in FIG. 10.

This IPS mode liquid crystal display panel 50A has an array substrate AR and a color filter substrate CF. The array substrate AR has multiple scan lines 52 and common wires 53 provided parallel with one another on a surface of a first transparent substrate 51, and multiple signal lines 54 provided in the direction crossing over these scan lines 52 and common wires 53. In the central portion of each pixel there is provided a common electrode 55 having for example a comb-like shape as in FIG. 10 and extending strip-like from the common wire 53. A pixel electrode 56, likewise of a comb-like shape, is provided so as to enclose the spaces around the peripheries of the common electrode 55, and the surface of the pixel electrode 56 is covered with, for instance, a protective insulator 57 of silicon nitride and an alignment layer 58 of polyimide or the like.

Close to the intersections of the scan lines 52 and signal lines 54 there are formed thin film transistors (TFTs) that serve as switching elements. For each TFT, a semiconductor layer 59 is laid between a scan line 52 and signal line 54; a signal line portion on the semiconductor layer 59 constitutes the TFT's source electrode S and a scan line portion below the semiconductor layer 59 constitutes the gate electrode G, while the drain electrode D is constituted by a part of the pixel electrode 56 that overlaps part of the semiconductor layer 59.

The color filter substrate CF has a configuration such that a color filter layer 61, overcoat layer 62 and alignment layer 63 are provided on a surface of a second transparent substrate 60. To form the IPS mode liquid crystal display panel 50A, the array substrate AR and color filter substrate CF are positioned opposing each other so that the pixel electrode 56 and common electrode 55 on the array substrate AR and the color filter layer 61 on the color filter substrate CF face each other, liquid crystal LC is sealed therebetween, and polarizing plates 64 and 65 are deposed on the outer side of substrates AR and CF respectively, placed so that their polarization directions cross over each other.

In this IPS mode liquid crystal display panel 50A, when an electric field is formed between the pixel electrode 56 and common electrode 55, the liquid crystals, which are aligned horizontally, will gyrate horizontally as shown in FIGS. 11 and 12. By means of this it is possible to control the amount of incident light from the backlight that is transmitted. This IPS mode liquid crystal display panel 50A has the advantages of a wide viewing angle and high contrast, but also has the problems of low aperture ratio and transmittance because the common electrodes 55 are formed from the same metallic material as the common wires 53 or scan lines 52, as well as the problem of color variation depending on the viewing angle.

FFS mode liquid crystal display panels (see JP-A-2002-14363 and JP-A-2002-244158) have been developed in order to resolve the problems of low aperture ratio and transmittance in IPS mode liquid crystal display panels. The operating principles of such an FFS mode liquid crystal display panel will now be described using FIGS. 13 to 15. FIG. 13 is a schematic plan view of a single pixel portion of an FFS mode liquid crystal display panel, FIG. 14 is a cross-sectional view along line XIV-XIV in FIG. 13, and FIG. 15 is a cross-sectional view along line XV-XV in FIG. 13.

This FFS mode liquid crystal display panel 70A has an array substrate AR and a color filter substrate CF. The array substrate AR has multiple scan lines 72 and common wires 73 provided parallel with one another on a surface of a first transparent substrate 71, and multiple signal lines 74 provided in the direction crossing over these scan lines 72 and common wires 73. A common electrode (also termed "opposed electrodes") 75 connected to the common wires 73 and formed from indium tin oxide (ITO) or a like transparent material is provided so as to cover each space delimited by the scan lines 72 and signal lines 74, and over a surface of the common electrode 75 there are provided, with a gate insulator 76 interposed, a pixel electrode 78A constituted of ITO or a like transparent material, in which there are formed multiple stripe-like slits 77A. The surfaces of the pixel electrode 78A and the multiple slits 77A therein are covered by an alignment layer 80.

Close to the positions where the scan lines 72 and signal lines 74 intersect there are formed TFTs that serve as switching elements. For each TFT, a semiconductor layer 79 is laid on a surface of a scan line 72, and a portion is extended from a signal line 74 so as to cover part of the semiconductor layer 79's surface and constitute the TFT's source electrode S; a scan line portion below the semiconductor layer 79 constitutes the gate electrode G, while a part of the pixel electrode 78A that overlaps part of the semiconductor layer 79 constitutes the drain electrode D.

The color filter substrate CF has a configuration such that a color filter layer 83, overcoat layer 84, and alignment layer 85 are provided on a surface of a second transparent substrate 82. To form the FFS mode liquid crystal display panel 70A, the array substrate AR and color filter substrate CF are positioned opposing each other so that the pixel electrode 78A and common electrode 75 on the array substrate AR and the color filter layer 83 on the color filter substrate CF face each other, liquid crystal LC is sealed therebetween, and polarizing plates 86 and 87 are deposed on the outer side of substrates AR and CF respectively, placed so that their polarization directions are orthogonal to each other.

In this FFS mode liquid crystal display panel 70A, when an electric field is formed between the pixel electrode 78A and common electrode 75, the field is oriented toward the common electrode 75 at both sides of the pixel electrode 78A, as shown in FIGS. 14 and 15, and consequently, not only does the liquid crystal present at the slits 77A move, but so does the liquid crystal present over the pixel electrode 78A. As a result, The FFS mode liquid crystal display panel 70A has the features of having an even wider viewing angle and higher contrast than the IPS mode liquid crystal display panel 50A, and moreover an ability to provide bright displays thanks to possessing high transmittance. In addition, the FFS mode liquid crystal display panel 70A has a greater overlap area, viewed from above, between the pixel electrode 78A and common electrode 75 than has the IPS mode liquid crystal display panel 50A, and, as a collateral effect thereof, a larger holding capacity and hence the advantage that no auxiliary capacity line needs to be specially provided.

In an FFS mode liquid crystal display panel, similarly to the case of an IPS mode liquid crystal display panel, it is preferable for the sake of the display characteristics that the rubbing direction should be orthogonal to the signal lines, and the pixel electrodes be provided at a slight inclined angle relative to the rubbing direction. Accordingly, a structure may be adopted whereby stripe-like slits 77B provided in a pixel electrode 78B are inclined relative to the scan lines 72 or common wires 73 as in the FFS mode liquid crystal display panel 70B shown in FIG. 16. Similarly, in order to eliminate color variation depending on the viewing angle, the stripe-like slits 77C provided in a pixel electrode 78C may be arranged in two mutually inclined sets, one above the other, thus producing dual domains, as in the FFS mode liquid crystal display panel 70C shown in FIG. 17. Further, the signal lines 72 may be provided in a crank-shape in a direction orthogonal to the scan lines 74, and the multiple common electrodes and pixel electrodes 78D be arranged in a delta layout, so that the black matrices provided on the color filter substrate at the portions opposed to the signal lines 72 will not form straight lines, and the device will be capable of image displays in which the black matrices are inconspicuous, as in the FFS mode liquid crystal display panel 70D shown in FIG. 18.

The FFS mode liquid crystal display panels 70B and 70C shown in FIGS. 16 and 17 differ from the FFS mode liquid crystal display panel 70A shown in FIG. 13 only in that the slits 77B and 77C provided in their pixel electrodes 78B and 78C are inclined. Moreover, the FFS mode liquid crystal display panel 70D shown in FIG. 18 differs from the FFS mode liquid crystal display panel 70A shown in FIG. 13 only in that slits 77D provided in its pixel electrodes 78D are inclined and that its multiple common electrodes and pixel electrodes 78D are arranged in a delta layout. Below therefore, component elements that have identical structure to those in the FFS mode liquid crystal display panel 70A shown in FIG. 13 are assigned the identical reference numerals and detailed descriptions thereof are omitted.

Also in the IPS mode liquid crystal display panel 50A shown in FIG. 10, it is possible, similarly with the FFS mode liquid crystal display panels 70B and 70C described above, and as in the IPS mode liquid crystal display panel 50B shown in FIG. 19, to improve the display quality by making the alignment layer's rubbing direction cross the signal lines 54 and providing a pixel electrode 55B and a common electrode 56B at a slight inclined angle relative to the rubbing direction; and further possible, as in the IPS mode liquid crystal display panel 50C shown in FIG. 20, to eliminate color variation depending on the viewing angle, by arranging a pixel electrode 55C and a common electrode 56C each to be inclined in a different extension direction, leftward or rightward, thus producing dual domains. In addition, although an illustration thereof is omitted among the drawings, it is also possible with such IPS mode liquid crystal display panels 50A, 50B, 50C to arrange the multiple pixel electrodes 55, 55A, 55B and common electrodes 56, 56A, 56B in a delta layout so as to obtain an image display in which the black matrices are inconspicuous, as in the FFS mode liquid crystal display panel 70D shown in FIG. 18. Moreover, the IPS mode liquid crystal display panels 50B and 50C shown in FIGS. 19 and 20 differ from the IPS mode liquid crystal display panel 50A shown in FIG. 10 only in that their pixel electrodes 55B, 55C and common electrodes 56B, 56C are inclined. Below therefore, component elements that have identical structure to those in the IPS mode liquid crystal display panel 50A shown in FIG. 10 are assigned the identical reference numerals and detailed descriptions thereof are omitted.

Thus, FFS mode liquid crystal display panels have the features of having an even wider viewing angle and higher contrast than IPS mode liquid crystal display panels, and moreover of being able to provide bright displays thanks to possessing high transmittance. Furthermore they can be driven with low voltage, and what is more, have a larger holding capacity generated as collateral effect, which means that they yield good display quality without special provision of auxiliary capacity lines.

However, it is well known that when used for prolonged periods, liquid crystal display panels are prone to the phenomenon of burn-in. This is the case both with IPS mode liquid crystal display panels and with FFS mode liquid crystal display panels. But it has been found that the burn-in phenomenon occurs more markedly in related art FFS mode liquid crystal display panels such as described above than in related art IPS mode liquid crystal display panels. The present inventors inferred, as a result of many and varied investigations into the causes of the burn-in phenomenon occurring more markedly in the FFS mode liquid crystal display panels than in the IPS mode liquid crystal display panels, that—it being the case that the electrical field produced by the large signal voltages applied to the scan lines affects the alignment of the nearby liquid crystals—a contributory factor is that whereas in the IPS mode liquid crystal display panels the path of the electrical force lines oriented from the pixel electrode toward the liquid crystals and the path of the electrical force lines oriented from the liquid crystals toward the scan lines are symmetrical, in the FFS mode liquid crystal display panels they are asymmetrical.

More precisely, in IPS and FFS mode liquid crystal display panels, the voltage applied to the scan lines is approximately −10V in the state when given pixels are deselected, and approximately +15V in the state when selected, but since the duration for which given pixels are selected is extremely short, DC voltage of approximately −10V is applied over extended periods. In the case of an IPS mode liquid crystal display panel however, as is plain from FIG. 12, an electrical force line E1 oriented from the pixel electrode 56 to the scan line 52 enters the liquid crystal layer LC via the pixel electrode 56, protective insulator 57, and alignment layer 58, and from the liquid crystal layer LC reaches the scan line 52 via the alignment layer 58 and protective insulator 57; thus, the force line's path in traveling from the pixel electrode 56 to the liquid crystal layer LC is symmetrical with the path thereof in traveling from the liquid crystal layer LC to the scan line 52.

In an FFS mode liquid crystal display panel by contrast, as is plain from FIG. 15, an electrical force line E2 oriented from the pixel electrode 78A to the scan line 72 enters the liquid crystal layer LC via the pixel electrode 78A and alignment layer 80, but from the liquid crystal layer LC reaches the scan line 72 via the alignment layer 80 and gate insulator 76. Thus, the force line's path in traveling from the pixel electrode 78A to the liquid crystal layer LC is asymmetrical with the path thereof in traveling from the liquid crystal layer LC to the scan line 72. As a result, in the FFS mode liquid crystal display panel the pixel electrode and/or the alignment layer on the surface thereof are more prone than in the IPS mode liquid crystal display panel to be irreversibly affected by the DC field arising from the signals applied to the scan lines 72. This is inferred to be the reason why the burn-in phenomenon occurs more markedly in the FFS mode liquid crystal display panel than in the IPS mode liquid crystal display panel.

SUMMARY

The inventors arrived at the present invention when they discovered, as a result of intensive and extensive investigations to alleviate the problem of burn-in with such FFS mode liquid crystal display panels, that although in FFS mode liquid crystal display panels it is problematic, due to the operating principles thereof, to render symmetrical the path of the electric field lines from the pixel electrodes to the liquid crystal layer and the path thereof from the liquid crystal layer to the scan lines; nevertheless, by ensuring that the DC field arising from the high voltage signals applied to the scan lines is not applied to the nearby liquid crystals, it is possible to reduce burn-in not only in FFS mode liquid crystal display panels but in IPS mode liquid crystal display panels also.

JP-A-2002-131767 discloses an IPS mode liquid crystal display panel in which partially superposed conductive layers are provided over the signal lines or the scan lines or both, with the purpose of preventing the light leak that will occur if the liquid crystals are driven by the electric field that arises between the signal lines (drain signal lines) or scan lines (gate signal lines) and the electrodes deposed adjacent thereto. However, although suggestions partially concerning FFS mode liquid crystal display panels are contained therein (see paragraphs [0003] and [0004]), no specific instance of an FFS mode liquid crystal display panel is described therein. Nor is there any hint therein concerning burn-in problems in either IPS mode or FFS mode liquid crystal display panels.

An advantage of some aspects of the present invention is to provide a transverse field type—that is, an IPS mode or FFS mode—liquid crystal display panel that has a device for preventing burn-in due to the voltage applied to the scan lines.

According to an aspect of the invention, a transverse field type liquid crystal display panel includes multiple scan lines and common wires provided in parallel, multiple signal lines provided in a direction crossing the scan lines, and common electrodes and pixel electrodes formed in regions delimited by the scan lines and signal lines, and has the feature that shield electrodes constituted of a conductive material are formed on a surface of an insulator lying over the scan lines.

In another aspect of the invention, the shield electrodes may be electrically connected to the common electrodes.

In another aspect, the shield electrodes may partially have cut-aways provided close to the shield electrodes, and the shield electrodes be extended to above the insulator at the cut-aways and electrically connected to the common electrodes via contact holes provided in the cut-aways.

In another aspect, the shield electrodes may be electrically connected to the signal lines.

In another aspect, the shield electrodes may be extended over the surface of the insulator over the scan lines as far as the intersections of the scan lines and signal lines, and be electrically connected to the signal lines via contact holes provided at the intersections.

In another aspect, the pixel electrodes may partially have cut-aways provided adjacent to the two sides of the scan lines, and the shield electrodes may be extended to above the surface of the insulator over the cut-aways and be electrically connected to each of the common electrodes located on the two sides of the scan lines via contact holes provided in the cut-aways.

In another aspect, the shield electrodes may cover half or more of each scan line.

In another aspect, the shield electrodes may be formed from the same material as the pixel electrodes.

In another aspect, the common electrodes may be formed with a comb-like shape in the regions delimited by the scan lines and signal lines, and the pixel electrodes, likewise of a comb-like shape, be formed so as to enclose the spaces around the peripheries of the comb-shaped common electrodes.

In another aspect, the common electrodes may be formed so as to cover the regions delimited by the scan lines and signal lines, and the pixel electrodes may be formed over the common electrodes, with an insulator interposed, and be provided with multiple slits that are parallel to one another.

In another aspect, the comb-shaped common electrodes and pixel electrodes, or the multiple slits, may be provided so as to be inclined relative to the scan lines or signal lines.

In another aspect, the comb-shaped common electrodes and pixel electrodes inside the regions delimited by the scan lines and signal lines may be provided so as each to be inclined in a different extension direction, leftward or rightward, to the other.

In another aspect, the common wires may be provided between the multiple scan lines, and the multiple slits be provided so as to be inclined in different directions to each other on the two sides of the common wires.

In another aspect, the numbers of slits provided on each of the two sides of the common wires may be equal.

In another aspect, the end portions of those slits on the two sides of each common wire that are closest thereto may be joined above the common wire.

In another aspect, the TFTs that serve as switching elements may be provided over the scan lines, close to points where the signal lines intersect therewith, and the shield electrodes be provided so as to cover over the scan lines except for the surfaces of the TFTs.

In another aspect, the signal lines may be provided in a crank shape in a direction crossing over the scan lines, and the multiple common electrodes and pixel electrodes be arranged in a delta layout.

Thanks to having a structure such as described above, the invention yields the excellent advantages that will now be described. According to a transverse field type liquid crystal display panel of some aspects of the invention, shield electrodes constituted of conductive material are formed on the surface of the insulator over the scan lines, so that the high voltage signals applied to the scan lines are blocked by the shield electrodes, which means that the DC component that is applied from the scan lines to the liquid crystals located above the shield electrodes is rendered small, thus drastically reducing the burn-in that can occur in a transverse field type liquid crystal display panel due to the high voltage signals applied to the scan lines. The shield electrodes may cover the scan lines entirely, or may cover a part thereof. Further, the shield electrodes may be in a "floating" state whereby they are not connected electrically to anything.

The potential of the shield electrodes in such floating state might become unstable, but according to another aspect of the invention, the shield electrodes are electrically connected to the common electrodes, so that the potential of the shield electrodes is stabilized, with the result that the burn-in that can occur in a transverse field type liquid crystal display panel due to the high voltage signals applied to the scan lines is further drastically reduced.

According to another aspect of the invention, to electrically connect the shield electrodes to the common electrodes, the shield electrodes are extended to above the insulator at the cut-aways provided in part of the pixel electrodes, and such connection is effected via contact holes. In this way, the shield electrodes and common electrodes are electrically connected in a structurally simple manner. In addition, electric field are also generated in the gap portions between the pixel electrodes and shield electrodes, and the alignment of the liquid crystal molecules is thereby regulated; as this is essentially equivalent to an increase in the aperture ratio for a transverse field type liquid crystal display panel, a liquid crystal display panel is obtained that gives bright displays.

According to another aspect of the invention, to electrically connect the shield electrodes to the common electrodes, the shield electrodes are extended to above the insulator at the cut-aways provided in part of the pixel electrodes, and are electrically connected to the common electrodes located on the two sides of each scan line via contact holes. In this way, the shield electrodes and common electrodes are electrically connected in a structurally simple manner, and furthermore, multiple common electrodes lying in the direction crossing the scan lines will be connected in series, which effectively means that the common wires' resistance will become low. Thereby, what is termed the "wiring delay" will become small, so that the common electrodes' potential will be stabilized and the display quality of each pixel will be improved.

In addition, electric field are also generated in the gap portions between the pixel electrodes and shield electrodes, and the alignment of the liquid crystal molecules is thereby regulated; as this is essentially equivalent to an increase in the aperture ratio for a transverse field type liquid crystal display panel, a liquid crystal display panel is obtained that gives bright displays.

According to a transverse field type liquid crystal display panel of other aspects of the invention, the shield electrodes cover half or more of each scan line, with the result that the influence exerted on the liquid crystal molecules, and hence on the pixel electrodes, by the electric field arising from the high voltage signals applied to the scan lines is kept small, and therefore, burn-in phenomenon of the transverse field type liquid crystal display panel will be unlikely to occur. It would be undesirable for the extent of each scan line covered by the shield electrodes to be less than half, since the smaller such extent becomes, the more marked is the burn-in phenomenon. In other words, in proportion as the extent of each scan line covered by the shield electrodes is large, the phenomenon of transverse field type liquid crystal display panel burn-in will be less likely to occur. Additionally, the broad width of the shield electrodes means that their electrical resistance is small, so that what is termed the "wiring delay" will be short and the display quality of each pixel will be improved.

According to another aspect, the shield electrodes are formed from the same material as the pixel electrodes, which means that the shield electrodes can be formed simultaneously with formation of the pixel electrodes and thus there is no need for an increase in time and process especially in order to form the shield electrodes.

According to another aspect, the shield electrodes are electrically connected to the signal lines, with the result that the shield electrodes' potential varies depending on the signals applied to the signal lines, but since the DC component of the signals applied to the signal lines is small, and moreover the high voltage signals applied to the scan lines are blocked out by the shield electrodes, the DC field applied from the scan lines to the liquid crystals located above the shield electrodes is effectively eliminated, and thereby the burn-in phenomenon due to the high voltage signals applied to the scan lines in a transverse field type liquid crystal display panel is drastically reduced.

According to another aspect, to electrically connect the shield electrodes to the scan lines, the shield electrodes are extended to the intersections between the scan lines and signal lines, and such connection is effected via contact holes. In this way, the shield electrodes and scan lines are electrically connected in a structurally simple manner.

According to another aspect, the advantages of the invention can be yielded satisfactorily even if the transverse field type liquid crystal display panel is an IPS mode liquid crystal display panel with comb-like common and pixel electrodes that enclose the spaces around each other's peripheries.

According to another aspect, comb-like common electrodes and pixel electrodes in an IPS mode liquid crystal display panel are provided so as to be inclined relative to the scan lines or signal lines, which means that a minute-angle inclination can be formed between the pixel electrodes and the rubbing direction of the alignment layer, so that an IPS mode liquid crystal display panel is obtained that has good contrast and other display characteristics while also yielding the advantages of the invention.

According to another aspect, comb-like common electrodes and pixel electrodes in an IPS mode liquid crystal display panel are provided so as each to be inclined in a different direction, leftward or rightward, in the regions delimited by the scan lines and signal lines, thus producing dual domains. Thereby, color variation depending on the viewing angle is eliminated, and hence an IPS mode liquid crystal display panel is obtained that has good display characteristics while also yielding the advantages of the invention.

According to another aspect, the advantages of the invention can be yielded satisfactorily even if the transverse field type liquid crystal display panel is an FFS mode liquid crystal display panel with common electrodes that are formed in the regions delimited by the scan lines and signal lines, and with pixel electrodes that have multiple slits and are formed over the common electrodes with an insulator interposed.

According to another aspect, the slits in an FFS mode liquid crystal display panel are provided so as to be inclined relative to the scan lines or signal lines, which means that a minute-angle inclination can be formed between the pixel electrodes and the rubbing direction of the alignment layer, so that an FFS mode liquid crystal display panel is obtained that has good contrast and other display characteristics while also yielding the advantages of the invention.

According to another aspect, the common wires are provided between the multiple scan lines, and furthermore the multiple slits in an FFS mode liquid crystal display panel are provided so as to be inclined in different directions to each other on the two sides of the common wires, thus producing dual domains. Thereby, color variation depending on the viewing angle is eliminated, and hence an FFS mode liquid crystal display panel is obtained that has good display characteristics while also yielding the advantages of the invention.

Usually the common wires will be fabricated from the same conductive material as the scan lines and therefore be opaque, but according to a further aspect of the invention, the end portions of those slits on the two sides of each common wire that are closest thereto are joined above the common wire, so that the common wire blocks light at the disclination portions that occur at the positions where the slit sets inclined in different directions to each other are adjacent. As a result, an FFS mode liquid crystal display panel is obtained that has good display characteristics while also yielding the advantages of the invention.

According to a still further aspect, the TFTs that serve as switching elements are provided over the scan lines, close to the points where the signal lines intersect therewith, so that the pixel electrodes can be rendered larger to the extent of the space thereby created. In addition, the shield electrodes are provided so as to cover over the scan lines except for the surfaces of the TFTs, so that the operation of the TFTs will not be affected by the shield electrodes' potential. Thus, a transverse field type liquid crystal display panel is obtained that exhibits stable display characteristics while yielding the advantages of the invention.

According to a yet further aspect, the signal lines are provided in a crank-shape in the direction crossing over the scan lines, and the multiple common electrodes and pixel electrodes are arranged in a delta layout (also termed a triad layout). As a result, the black matrices that are provided in the portions opposed to the signal lines will not form straight lines and therefore will be inconspicuous, so that a transverse field type liquid crystal display panel is obtained that is well suited for image displays while yielding the advantages of the invention.

BRIEF DESCRIPTION OF THE DRAWINGS

The invention is described with reference to the accompanying drawings, wherein like numbers reference like elements.

DESCRIPTION OF EXEMPLARY EMBODIMENTS

Exemplary embodiments of the invention will now be described with reference to the accompanying drawings. It should be understood however that the FFS mode liquid crystal display panels in the following embodiments are described by way of examples of transverse field type liquid crystal display panels embodying the technical thought of the invention, and are not intended to limit the invention to these particular FFS mode liquid crystal display panels. The invention can equally well be adapted to yield other embodiments of FFS mode liquid crystal display panels, etc., within the scope and spirit of the claims.

First Embodiment

Figure 1:
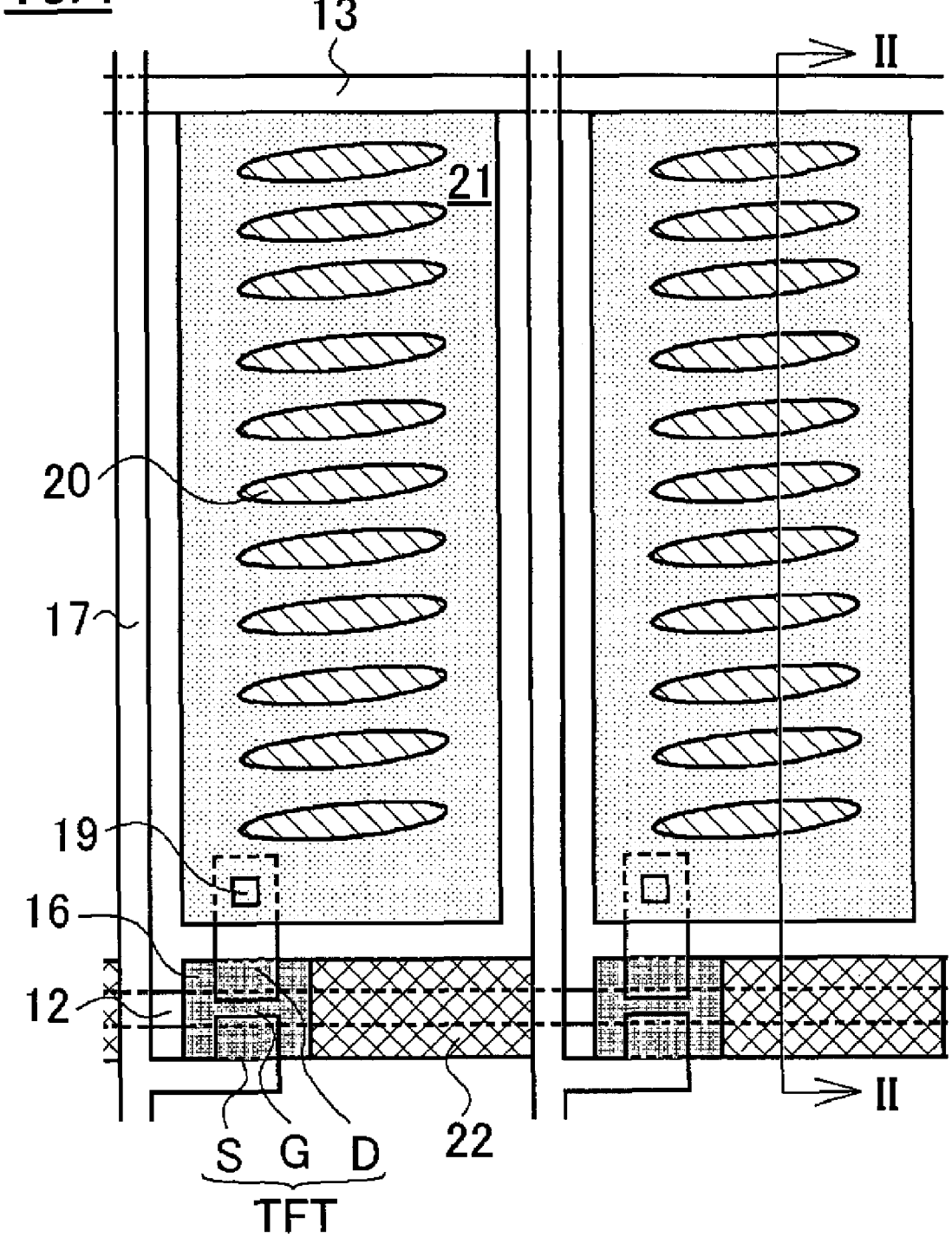
FIG. 1 is a schematic plan view of two pixel portions of an FFS mode liquid crystal display panel of a first embodiment, seen through the color filter substrate.
Figure 2:
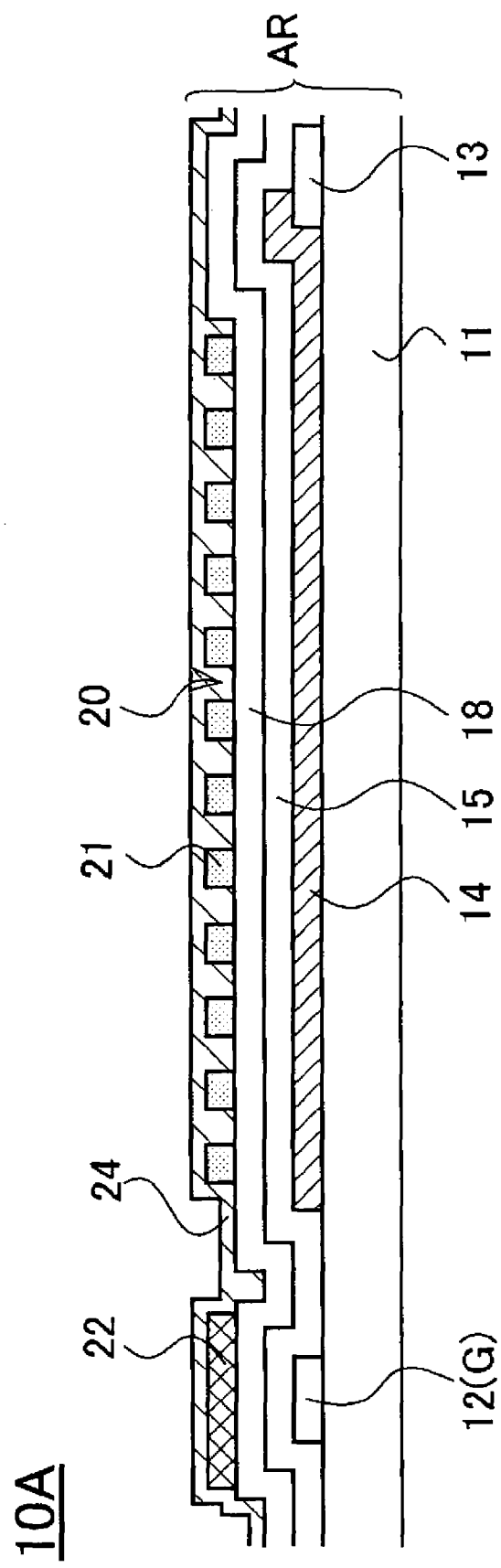
FIG. 2 is a cross-sectional view along line II-II in FIG. 1.

An FFS mode liquid crystal display panel 10A of a first embodiment of the invention is described below by recounting the process of its manufacture, using FIGS. 1 and 2. FIG. 1 is a schematic plan view of two pixel portions of the FFS mode liquid crystal display panel of the first embodiment, seen through the color filter substrate, and FIG. 2 is a cross-sectional view along line II-II in FIG. 1.

According to the first embodiment of the invention, an array substrate AR of the FFS mode liquid crystal display panel 10A includes a transparent substrate 11 constituted by a substrate of glass or the like, over the entire surface of which a 2-layer film composed of a lower layer of aluminum (Al) metal and a surface layer of molybdenum (Mo) metal is formed, from which film there are then formed, by photolithographic and etching methods, multiple scan lines 12 and common wires 13, lying parallel to each other and including Mo—Al 2-layer wiring lines. Aluminum has the merit that its resistance is low, but on the other hand has the shortcomings of being prone to corrosion and having high contact resistance with ITO. Accordingly, a structure whereby the aluminum is covered over with molybdenum is adopted so as to ameliorate such shortcomings. The common wires 13 are provided alongside scan lines in the example given here, but could alternatively be provided between adjacent scan lines 12.

Next, the entire surface of the transparent substrate 11 with the scan lines 12 and common wires 13 formed thereon is covered with a transparent conductive layer constituted of, for instance, ITO, from which common electrodes 14 are then formed, again using photolithographic and etching methods. The common electrodes 14 are electrically connected to the common wires 13, but are not connected to the scan lines 12 or gate electrodes G. The entire surface is further covered with a gate insulator 15 constituted of a silicon nitride or silicon oxide layer, then the entire surface of the gate insulator 15 is covered with a layer of, for instance, amorphous silicon ("a-Si" below) via the CVD method, after which a semiconductor layer 16 constituted of an a-Si layer is formed in the TFT formation areas, once again using photolithographic and etching methods. The regions of the scan lines 12 at the positions where the semiconductor layer 16 is formed form the gate electrodes G of the TFTs.

Next, the entire surface of the transparent substrate 11 with the semiconductor layer 16 formed thereon is covered with an Mo—Al—Mo 3-stratum conductive layer, from which signal lines 17 and drain electrodes D are then formed, once again using photolithographic and etching methods. The source electrode S portions of the signal lines 17, and the drain electrode D portions, both overlap partially with the surface of the semiconductor layer 16. Further, the entire surface of the substrate is then covered with an insulator constituted of a silicon nitride layer.

Next, contact holes 19 are formed in the positions in the insulator 18 that correspond to the drain electrodes D, so as to partially expose the drain electrodes D. Following that, the entire surface is covered with a transparent conductive layer constituted of, for instance, ITO, from which, once again using photolithographic and etching methods, pixel electrodes 21 having slits 20 are then formed over the regions of the insulator 18 that are enclosed by the scan lines 12 and signal lines 17, in the pattern shown in FIG. 1, and moreover, shield electrodes 22 are formed to extend part-way over the surface of the insulator 18 lying over the scan lines 12. The pixel electrodes 21 are electrically connected to the drain electrodes D via the contact holes 19, whereas the shield electrodes 22 are not connected to anything, being in a floating state. So that they will not affect the operating characteristics of the TFTs, the shield electrodes 22 will preferably not cover the surface of the semiconductor layer 16. Also, the shield electrodes 22 may be formed from aluminum or a like conductive metal instead of from ITO.

In addition, if necessary a passivation layer (not shown in the drawings) constituted of, for instance, silicon nitride is provided over the entire surface, and a predetermined alignment layer 24 is formed over the entire surface of the passivation layer. Thereupon, the array substrate AR is complete. Subsequently, to obtain the FFS mode liquid crystal display panel 10A of the embodiment, the array substrate AR fabricated in the foregoing manner is positioned facing a separately fabricated color filter substrate, the peripheries of the two substrates are sealed with sealing material, and liquid crystal is poured into the space therebetween. As the configuration of the color filter substrate essentially does not differ from that in the related art described earlier, detailed descriptions thereof are omitted.

In the FFS mode liquid crystal display panel 10A of the first embodiment obtained in the foregoing manner, at least a part of the surface of each scan line 12 is covered by a conductive shield electrode 22. Thanks to this, the liquid crystals will not be driven by the DC field generated by the high voltage signals applied to the scan lines 12, and consequently the FFS mode liquid crystal display panel burn-in phenomenon will be drastically reduced.

Second Embodiment

Figure 3:
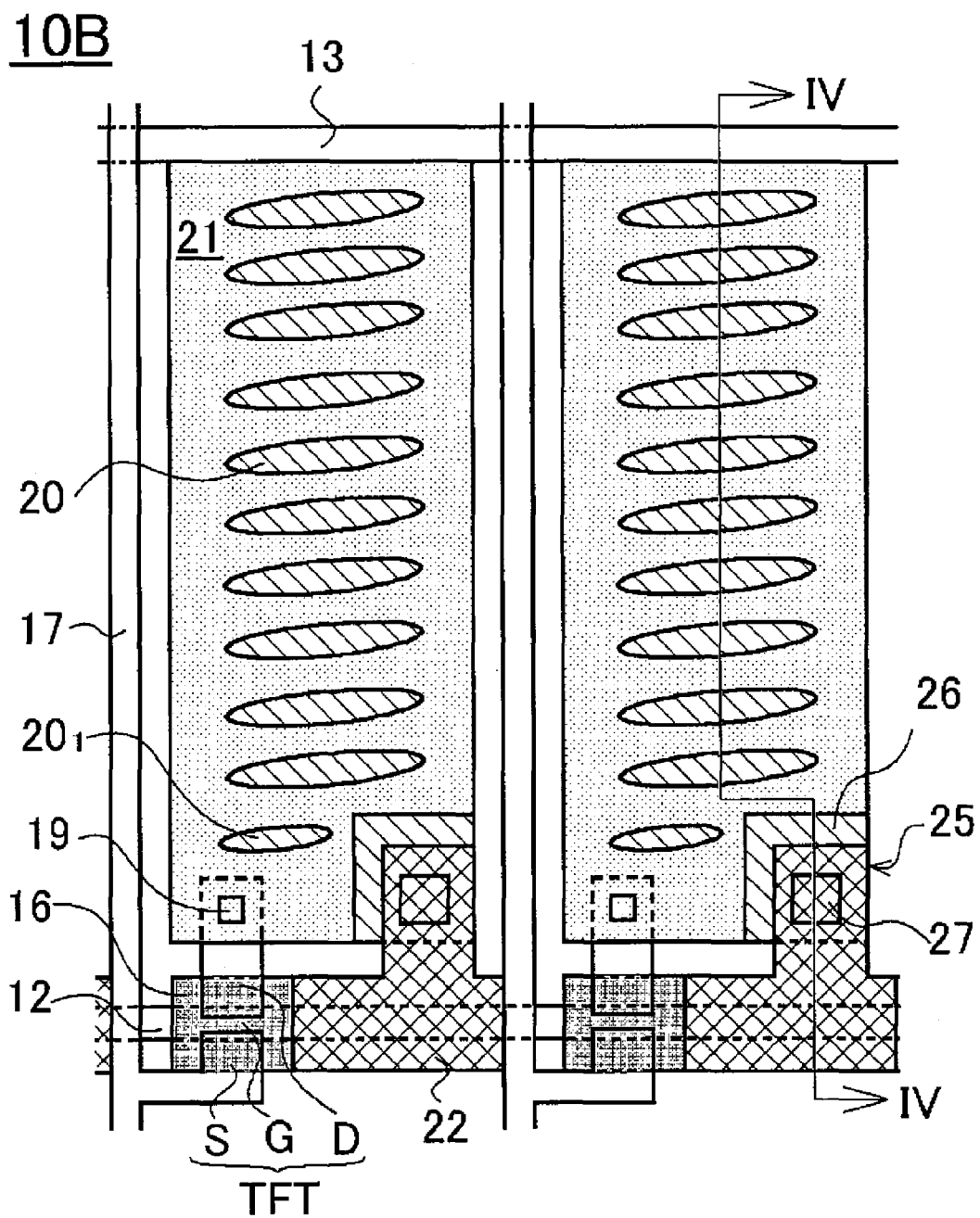
FIG. 3 is a schematic plan view of two pixel portions of an FFS mode liquid crystal display panel of a second embodiment, seen through the color filter substrate.
Figure 4:
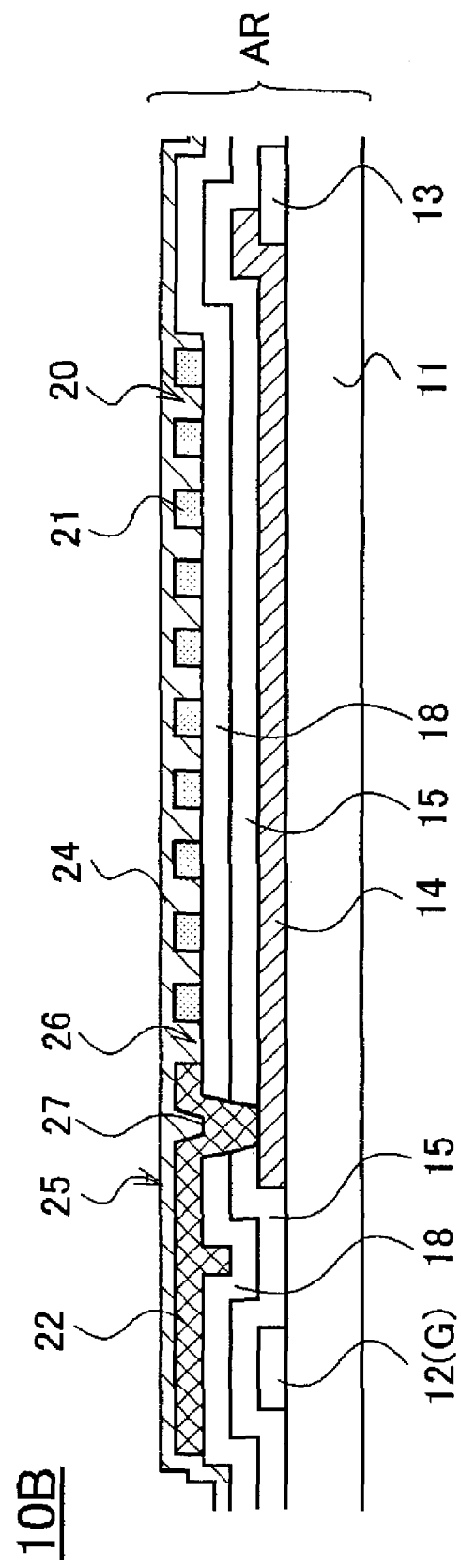
FIG. 4 is a cross-sectional view along line IV-IV in FIG. 3.

With the FFS mode liquid crystal display panel 10A of the first embodiment, the shield electrodes 22 are in a floating state, which means that the potential of the shield electrodes 22 could become unstable due to the influence of external fields, and fluctuate markedly. Accordingly, an FFS mode liquid crystal display panel 10B of a second embodiment stabilizes the potential of the shield electrodes 22 by electrically connecting the shield electrodes 22 to the common electrodes 14. Such FFS mode liquid crystal display panel 10B of the second embodiment will now be described using FIGS. 3 and 4. FIG. 3 is a schematic plan view of two pixel portions of the FFS mode liquid crystal display panel of the second embodiment, seen through the color filter substrate, and FIG. 4 is a cross-sectional view along line IV-IV in FIG. 3. Component elements in FIGS. 3 and 4 that have identical structure to those in the FFS mode liquid crystal display panel 10A of the first embodiment shown in FIGS. 1 and 2 are assigned the identical reference numerals and detailed descriptions thereof are omitted.

The FFS mode liquid crystal display panel 10B of the second embodiment differs from the FFS mode liquid crystal display panel 10A of the first embodiment in that a cut-away 25 is provided at a corner portion of each pixel electrode 21 on an edge that is close to the shield electrode 22, part of the shield electrode 22 is extended to the cut-away 25, leaving a gap 26 with the pixel electrode 21, and the shield electrode 22 is electrically connected to the common electrode 14 via a contact hole 27 provided in the cut-away 25.

The fabrication process for the FFS mode liquid crystal display panel 10B of the second embodiment is the same as that described above for the FFS mode liquid crystal display panel 10A of the first embodiment as far as the stage where, following formation of the signal lines 17 and drain electrodes D, the entire surface of the substrate is covered with an insulator 18 constituted of a silicon nitride layer. Next, contact holes 19 and 27 are formed in the insulator 18 at the positions corresponding to the drain electrodes D and cut-aways 25, so as to expose a part of each drain electrode D and of each common electrode 14.

Further, the entire surface is covered with a transparent conductive layer of, for instance, ITO, after which, using photolithographic and etching methods, pixel electrodes 21 having slits 20 and a cut-away 25 are formed over the insulator 18 at the regions enclosed by the scan lines 12 and signal lines 17, in the patterns shown in FIG. 3, and in addition, shield electrodes 22 are formed over the insulator 18 so as to straddle the surface of the scan lines 12 and extend to the cut-aways 25, but leaving gaps 26 with the pixel electrodes 21. Thereby, the pixel electrodes 21 are electrically connected to the drain electrodes D via the contact holes 19, and the shield electrodes 22 are electrically connected to the common electrodes 14 via the contact holes 27. The remainder of the fabrication process is the same as that for the FFS mode liquid crystal display panel 10A of the first embodiment.

According to this FFS mode liquid crystal display panel 10B of the second embodiment, the shield electrodes 22 are electrically connected to the common electrodes 14 via the contact holes 27, thanks to which, the shield electrodes 22 have stable potential and hence are unlikely to be affected by electric field from the exterior, and furthermore, the liquid crystals will not be driven by the DC field generated by the high voltage signals applied to the scan lines 12. Consequently, the burn-in phenomenon will be drastically reduced in the FFS mode liquid crystal display panel 10B. In addition, according to the FFS mode liquid crystal display panel 10B of the second embodiment, although one slit $20_1$ is rendered shorter by the provision of a cut-aways 25 in each pixel electrode 21, the fact that electric fields are generated not only between the pixel electrode 21 and the common electrode 14 but also between the pixel electrode 21 and shield electrode 22 means that the gaps 26 between the pixel electrodes 21 and the shield electrodes 22 at the cut-aways 25 exert effects essentially equivalent with those of the slits 20 provided in the pixel electrodes 21. Thus, the gap 26 portions too serve as effective display areas, and consequently the aperture ratio is improved.

Third Embodiment

Figure 5:
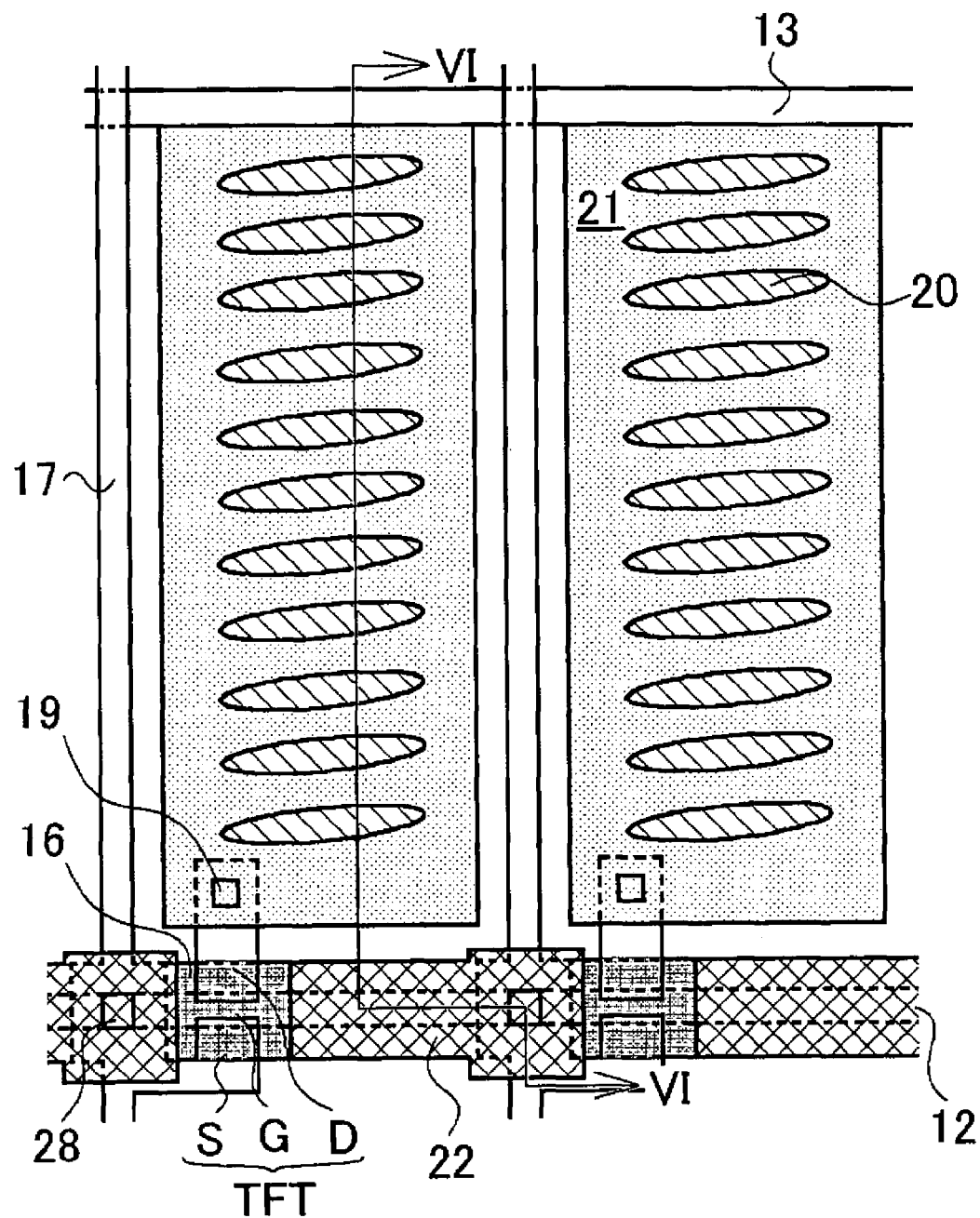
FIG. 5 is a schematic plan view of two pixel portions of an FFS mode liquid crystal display panel of a third embodiment, seen through the color filter substrate.
Figure 6:
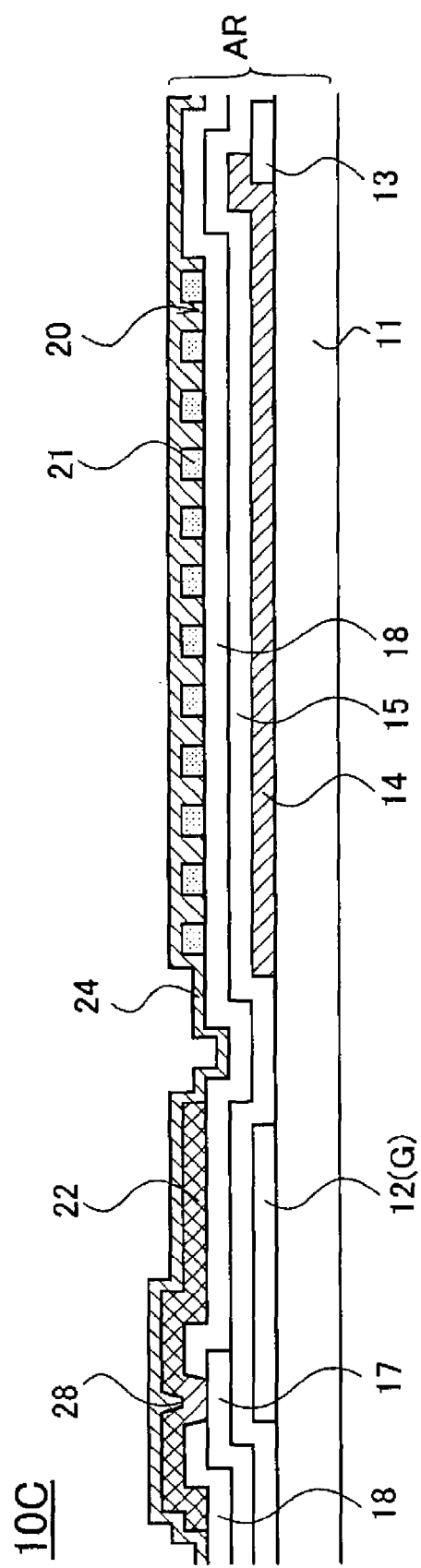
FIG. 6 is a cross-sectional view along line VI-VI in FIG. 5.

Whereas in the FFS mode liquid crystal display panel 10B of the second embodiment the potential of the shield electrodes 22 is stabilized by electrically connecting the shield electrodes 22 to the common electrodes 14 so as not to be affected by fields from the exterior, in an FFS mode liquid crystal display panel 10C of a third embodiment the potential of the shield electrodes 22 is stabilized by electrically connecting the shield electrodes 22 to the signal lines 17. This FFS mode liquid crystal display panel 10C of the third embodiment will now be described using FIGS. 5 and 6. FIG. 5 is a schematic plan view of two pixel portions of the FFS mode liquid crystal display panel of the third embodiment, seen through the color filter substrate, and FIG. 6 is a cross-sectional view along line VI-VI in FIG. 5. Component elements in FIGS. 5 and 6 that have identical structure to those in the FFS mode liquid crystal display panel 10A of the first embodiment shown in FIGS. 1 and 2 are assigned the identical reference numerals and detailed descriptions thereof are omitted.

The FFS mode liquid crystal display panel 10C of the third embodiment differs from the FFS mode liquid crystal display panel 10A of the first embodiment in that the shield electrodes 22 are extended to positions over the insulator 18 lying over the scan lines 12 that correspond to the intersections of the adjacent signal lines 17 therewith, and the shield electrodes 22 are electrically connected to the signal lines 17 via contact holes 28 provided in the insulator 18 at the positions corresponding to such intersections.

The fabrication process for the FFS mode liquid crystal display panel 10C of the third embodiment is the same as that described above for the FFS mode liquid crystal display panel 10A of the first embodiment as far as the stage where, following formation of the signal lines 17 and drain electrodes D, the entire surface of the substrate is covered with an insulator 18 constituted of a silicon nitride layer. Next, contact holes 19 and 28 are formed in the insulator 18 at the positions corresponding to the drain electrodes D and the intersections between the scan lines 12 and the signal lines 17, so as to expose a part of each drain electrode D and of each signal line 17.

Further, the entire surface is covered with a transparent conductive layer of, for instance, ITO, after which, using photolithographic and etching methods, pixel electrodes 21 having slits 20 are formed over the insulator 18 at the regions enclosed by the scan lines 12 and signal lines 17, in the patterns shown in FIG. 5, and in addition, shield electrodes 22 are formed on those parts of the insulator 18 that are located over the surfaces of the scan lines 12. Thereby, the pixel electrodes 21 are electrically connected to the drain electrodes D via the contact holes 19, and the shield electrodes 22 are electrically connected to the signal lines 17 via the contact holes 28. The remainder of the fabrication process is the same as that for the FFS mode liquid crystal display panel 10A of the first embodiment.

According to this FFS mode liquid crystal display panel 10C of the third embodiment, the shield electrodes 22 are electrically connected to the signal lines 17 via the contact holes 28, thanks to which, even if the potential of the shield electrodes 22 varies due to the signals applied to the signal lines 17, the DC component thereof will be small. Consequently, the liquid crystals will be affected only to a small extent by signal line 17 signals applied to the shield electrodes 22, besides being unlikely to be affected by electric field from the exterior, and in addition, the liquid crystals will not be driven by the electric field that is generated by the high voltage signals applied to the scan lines 12. As a result, the FFS mode liquid crystal display panel burn-in phenomenon will be drastically reduced.

Fourth Embodiment

Figure 7:
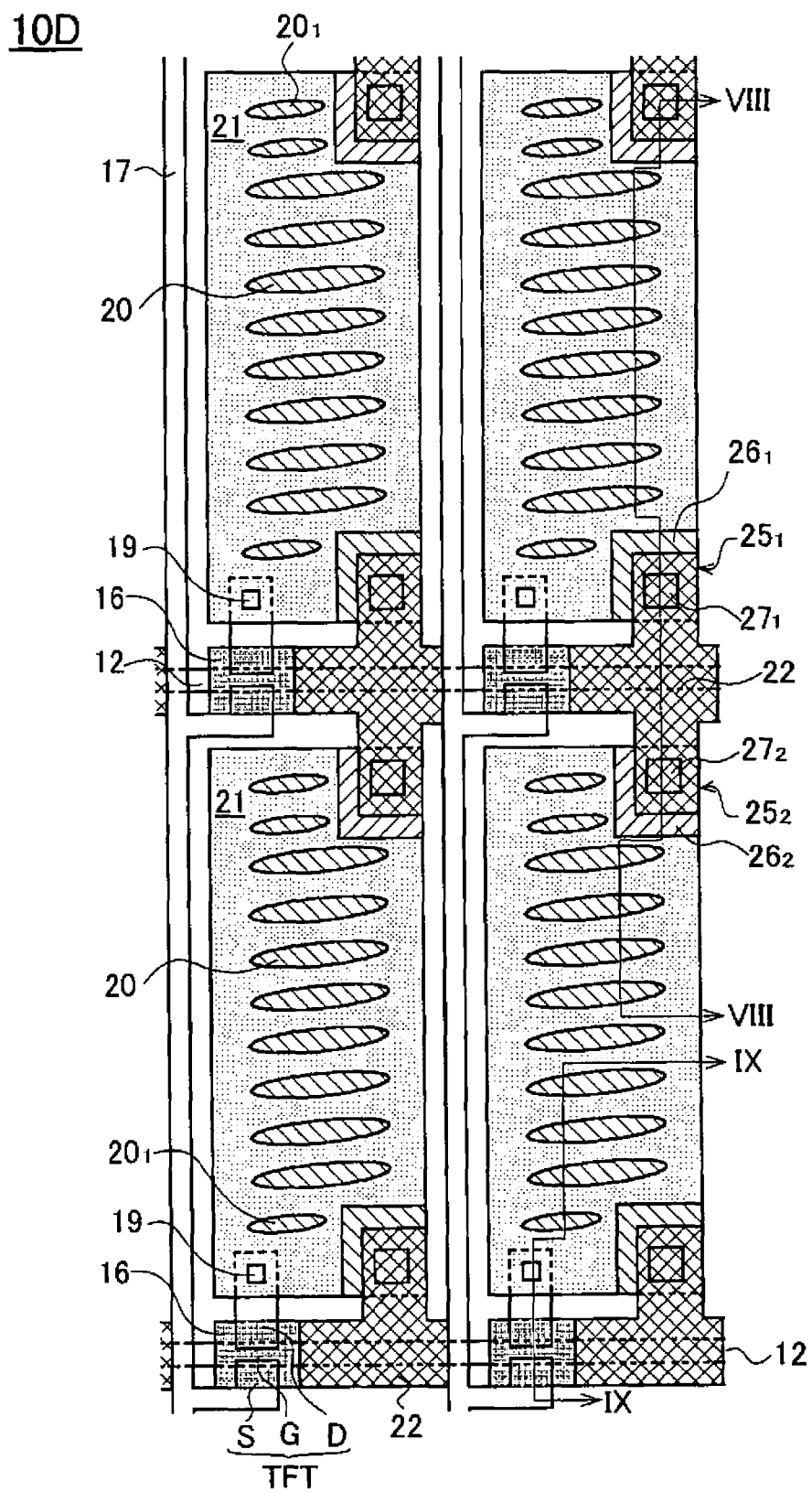
FIG. 7 is a schematic plan view of four pixel portions of an FFS mode liquid crystal display panel of a fourth embodiment, seen through the color filter substrate.
Figure 8:
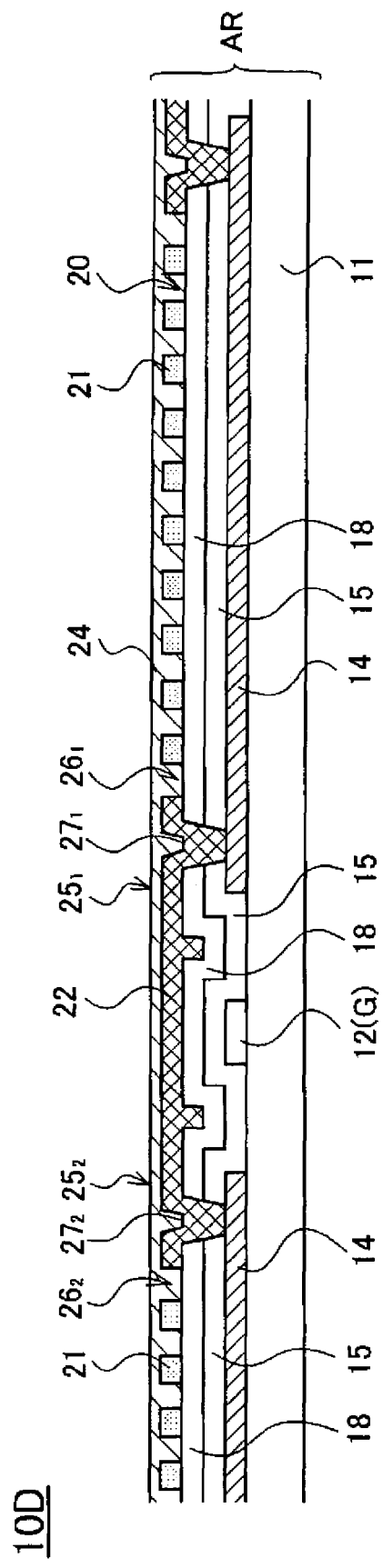
FIG. 8 is a cross-sectional view along line VIII-VIII in FIG. 7.
Figure 9:
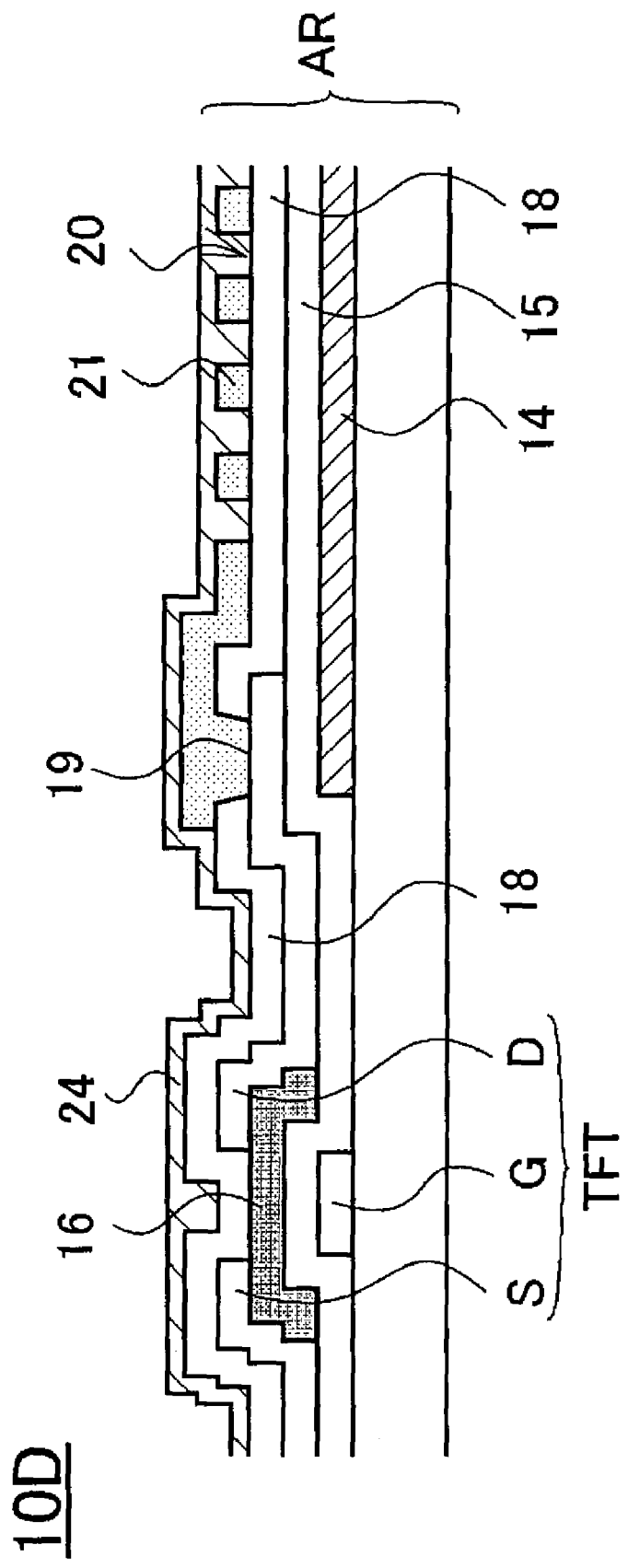
FIG. 9 is a cross-sectional view along line IX-IX in FIG. 7.

An FFS mode liquid crystal display panel 10D of a fourth embodiment of the invention is described below by recounting the process of the manufacture thereof, using FIGS. 7 to 9. FIG. 7 is a schematic plan view of four pixel portions of the FFS mode liquid crystal display panel of the fourth embodiment, seen through the color filter substrate, FIG. 8 is a cross-sectional view along line VIII-VIII in FIG. 7, and FIG. 9 is a cross-sectional view along line IX-IX in FIG. 7. Component elements in FIGS. 7 to 9 that have identical structure to those in the FFS mode liquid crystal display panel 10A of the first embodiment shown in FIGS. 1 and 2 are assigned the identical reference numerals and detailed descriptions thereof are omitted.

According to the fourth embodiment of the invention, an array substrate AR of the FFS mode liquid crystal display panel 10D has a transparent substrate 11 constituted by a substrate of glass or the like, over the entire surface of which 2-layer composed of a lower layer of Al metal and a surface layer of Mo metal is formed, from which layer there are then formed, by photolithographic and etching methods, multiple scan lines 12 and multiple common wires (omitted from the drawings), lying parallel to each other and including Mo—Al 2-layer wiring lines. The common wires are provided alongside the scan lines 12 in the example given here, but could alternatively be provided between adjacent scan lines 12.

Next, the entire surface of the transparent substrate 11 with the scan lines 12 and common wires formed thereon is covered with a transparent conductive layer constituted of, for instance, ITO, from which common electrodes 14 are then formed, again using photolithographic and etching methods. The common electrodes 14 are electrically connected to the common wires, but are not connected to the scan lines 12 or gate electrodes G. The entire surface is further covered with a gate insulator 15 constituted of a silicon nitride or silicon oxide layer, then the entire surface of the gate insulator is covered with a layer of, for instance, amorphous silicon ("a-Si" below) via the CVD method, after which a semiconductor layer 16 constituted of an a-Si layer is formed in the TFT formation areas, once again using photolithographic and etching methods. The regions of the scan lines 12 at the positions where the semiconductor layer 16 is formed form the gate electrodes G.

Next, the entire surface of the transparent substrate 11 with the semiconductor layer 16 formed thereon is covered with an Mo—Al—Mo 3-stratum conductive layer, from which signal lines 17 with a source electrode S portion, and drain electrodes D, are then formed, once again using photolithographic and etching methods. The source electrode S portions of the signal lines 17 and the drain electrode D portions both overlap partially with the surface of the semiconductor layer 16. Further, the entire surface of the substrate is then covered with an insulator 18 constituted of a silicon nitride layer.

Next, contact holes 19, $27_1$ and $27_2$ are formed in the positions in the insulator 18 that correspond to the cut-aways $25_1$ and $25_2$ described hereafter, so as to expose a part of each drain electrode D and a part of each common electrode 14.

Following that, the entire surface is covered with a transparent conductive layer constituted of, for instance, ITO, from which, once again using photolithographic and etching methods, pixel electrodes 21 having slits 20, as well as cut-aways $25_1$ and $25_2$ each located in a corner portion of one of the edges adjacent to the scan lines 12, are then formed over the regions of the insulator 18 that are enclosed by the scan lines 12 and signal lines 17, in the pattern shown in FIG. 7. Shield electrodes 22 also are formed on the insulator 18, across the surface of the scan lines 12 so as to straddle the cut-aways $25_1$ and $25_2$ on the two sides thereof, and leaving respective gaps $26_1$ and $26_2$ with the pixel electrode.

Thus, the pixel electrodes 21 are electrically connected to the drain electrodes D via the contact holes 19, and the shield electrodes 22 are electrically connected to the common electrodes 14 on the two sides of the scan lines 12 via the contact holes $27_1$ and $27_2$. Hence, the common electrodes 14 on the two sides of each scan line 12 are electrically connected to each other across the scan line 12 by the shield electrode 22.

As a further step, a predetermined alignment layer 24 is formed over the entire surface, whereupon the array substrate AR is complete. Subsequently, to obtain the FFS mode liquid crystal display panel 10D of the fourth embodiment, the array substrate AR fabricated in the foregoing manner is positioned facing a separately fabricated color filter substrate, the peripheries of the two substrates are sealed with sealing material, and liquid crystal is poured into the space therebetween. As the configuration of the color filter substrate essentially does not differ from that in the related art described earlier, detailed descriptions thereof are omitted.

In the FFS mode liquid crystal display panel 10D of the fourth embodiment obtained in the foregoing manner, at least a part of the surface of each scan line 12 is covered by the conductive shield electrodes 22. Thanks to this, the liquid crystals will not be driven by the DC field generated by the high voltage signals applied to the scan lines 12, and consequently the FFS mode liquid crystal display panel burn-in phenomenon will be drastically reduced. Also, the shield electrodes 22 are electrically connected to the common electrodes 14 located on the two sides of the scan lines 12 via the contact holes $27_1$ and $27_2$; consequently, the shield electrodes 22 have stable potential and therefore are unlikely to be affected by fields from the exterior, and moreover, the liquid crystals will not be driven by the DC field that is generated by the high voltage signals applied to the scan lines 12. Hence, the burn-in phenomenon will be drastically reduced in the FFS mode liquid crystal display panel 10D.

Further, according to this FFS mode liquid crystal display panel 10D, although some of the slits, i.e., slits $20_1$, are rendered shorter by the provision of the cut-aways $25_1$ and $25_2$ in the pixel electrodes 21, the fact that electric fields are generated not only between the pixel electrodes 21 and the common electrodes 14 but also between the pixel electrodes 21 and shield electrodes 22 means that the gaps $26_1$ and $26_2$ between the pixel electrodes 21 and the shield electrodes 22 at the cut-aways $25_1$ and $25_2$ exert effects that are essentially equivalent with those of the slits 20 provided in the pixel electrode 21. Thus, the gap $26_1$ and $26_2$ portions too serve as effective display areas, and consequently the aperture ratio is improved.

In addition, according to this FFS mode liquid crystal display panel 10D, the common electrodes 14 on the two sides of the scan lines 12 are electrically connected across the scan lines 12 by the shield electrodes 22, which means that all the common electrodes 14 aligned in a direction crossing over the scan lines 12 are connected in series via the shield electrodes 22. As a result, the common wires' resistance effectively becomes low, so that what is termed the "wiring delay" becomes small. Thereby, the common electrodes' potential is stabilized and an FFS mode liquid crystal display panel is obtained in which each pixel has good display quality.

The first to fourth embodiments represent examples where the scan lines 12 and signal lines 17 are provided so as to cross over one another in straight lines. But alternatively, the signal lines 17 may be provided in a crank-shape in a direction orthogonal to the scan lines 12, and the multiple common electrodes 14 and pixel electrodes 21 may be arranged in a delta layout, so that the black matrices provided on the color filter substrate in the portions opposed to the signal lines 17 will not form straight lines, and the device will be capable of image displays in which the black matrices are inconspicuous, as in the related art FFS mode liquid crystal display panel 70D shown in FIG. 18. As another alternative, the stripe-like slits provided in the pixel electrodes may be arranged in two mutually inclined sets, one above the other, thus producing dual domains, as in the related art FFS mode liquid crystal display panel 70C shown in FIG. 17. If the slits are arranged in this way to produce dual domains, it will be preferable to make the numbers of slits inclined in each direction equal, since this will prevent color variation depending on the viewing angle. It will also be preferable to join together the ends of those slits on the two sides of the common wire that are closest thereto, or in other words, the ends of the pair of slits—one in each of the mutually inclined sets—that are positioned closest to each other, since this will block light at the disclination portions that occur at such portions.

Figure 17:
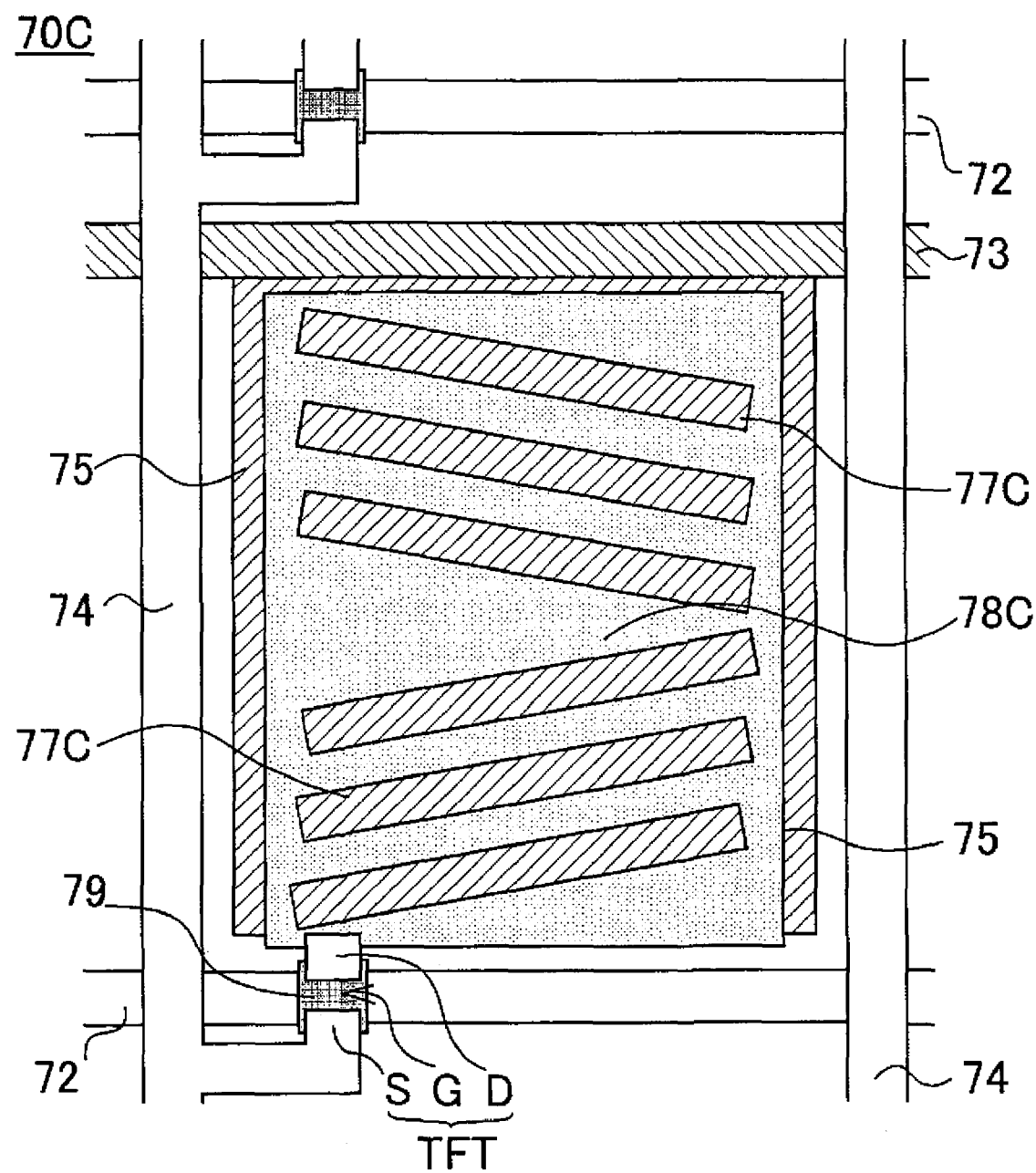
FIG. 17 is a schematic plan view of a related art FFS mode liquid crystal display panel with dual domains.
Figure 18:
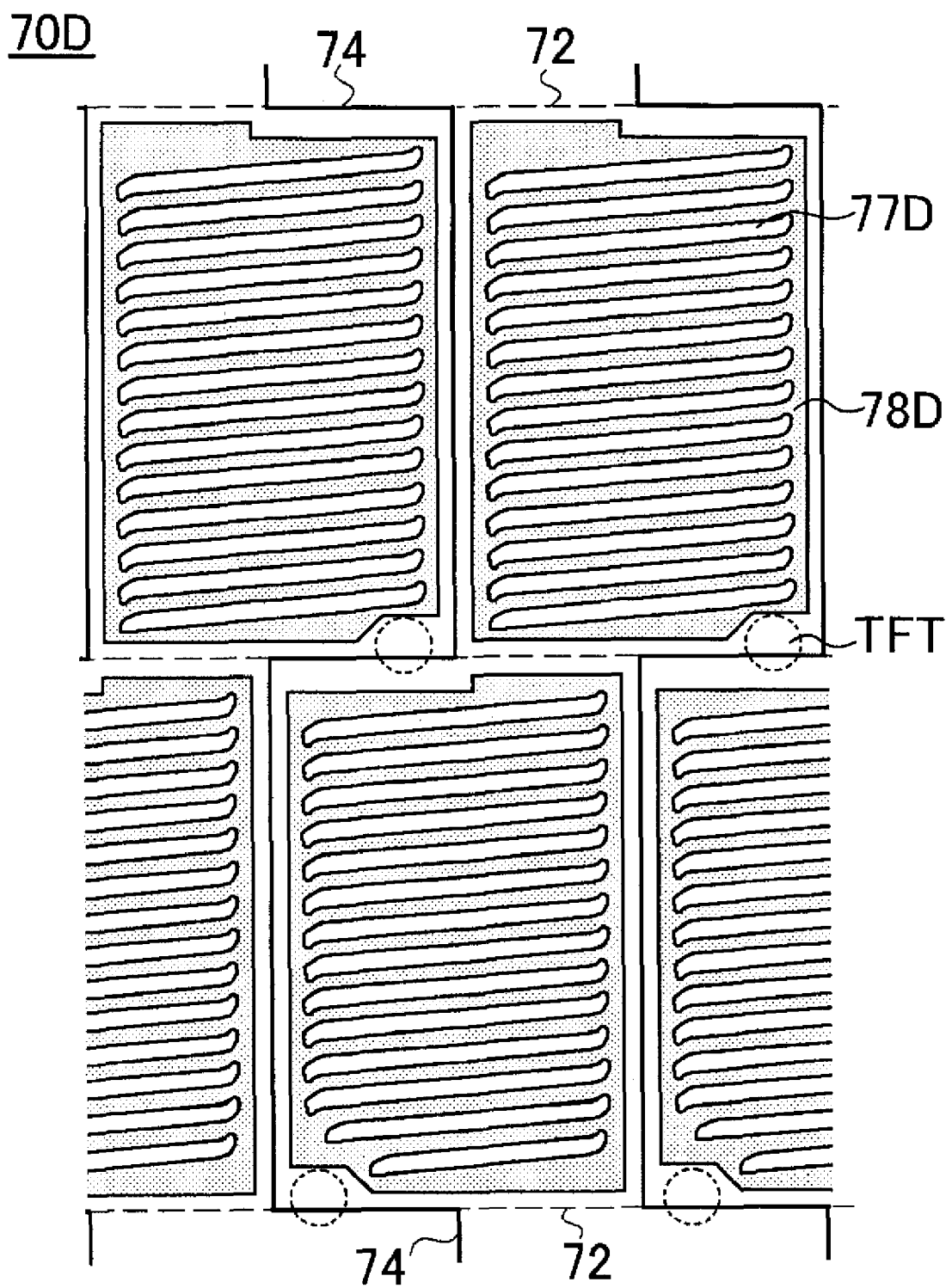
FIG. 18 is a schematic plan view of a related art FFS mode liquid crystal display panel with delta layout.

Although the first to fourth embodiments represent examples where the slits provided in the pixel electrodes 21 are inclined in a single direction, it will alternatively be possible, as in the related art FFS mode liquid crystal display panel 70C shown in FIG. 17, to arrange the stripe-like slits 77C provided in the pixel electrodes 78C in two mutually inclined sets, one above the other, thereby producing dual domains. In such a case, in order to reduce the viewing angle anisotropy to a low level, the numbers of slits 77C provided on each of the two sides of the common wire 73 will preferably be equal, and the ends of those slits on the two sides of each common wire 73 that are closest thereto will preferably be joined together over the common wire 73. A further alternative would be, as in the related art FFS mode liquid crystal display panel 70D shown in FIG. 18, to provide the signal lines 74 in a crank-shape in a direction orthogonal to the scan lines 72, and to arrange the multiple common electrodes and pixel electrodes 78D in a delta layout, so that the black matrices provided on the color filter substrate in the portions opposed to the signal lines 17 will not form straight lines, and the device will be capable of image displays in which the black matrices are inconspicuous.

Figure 10:
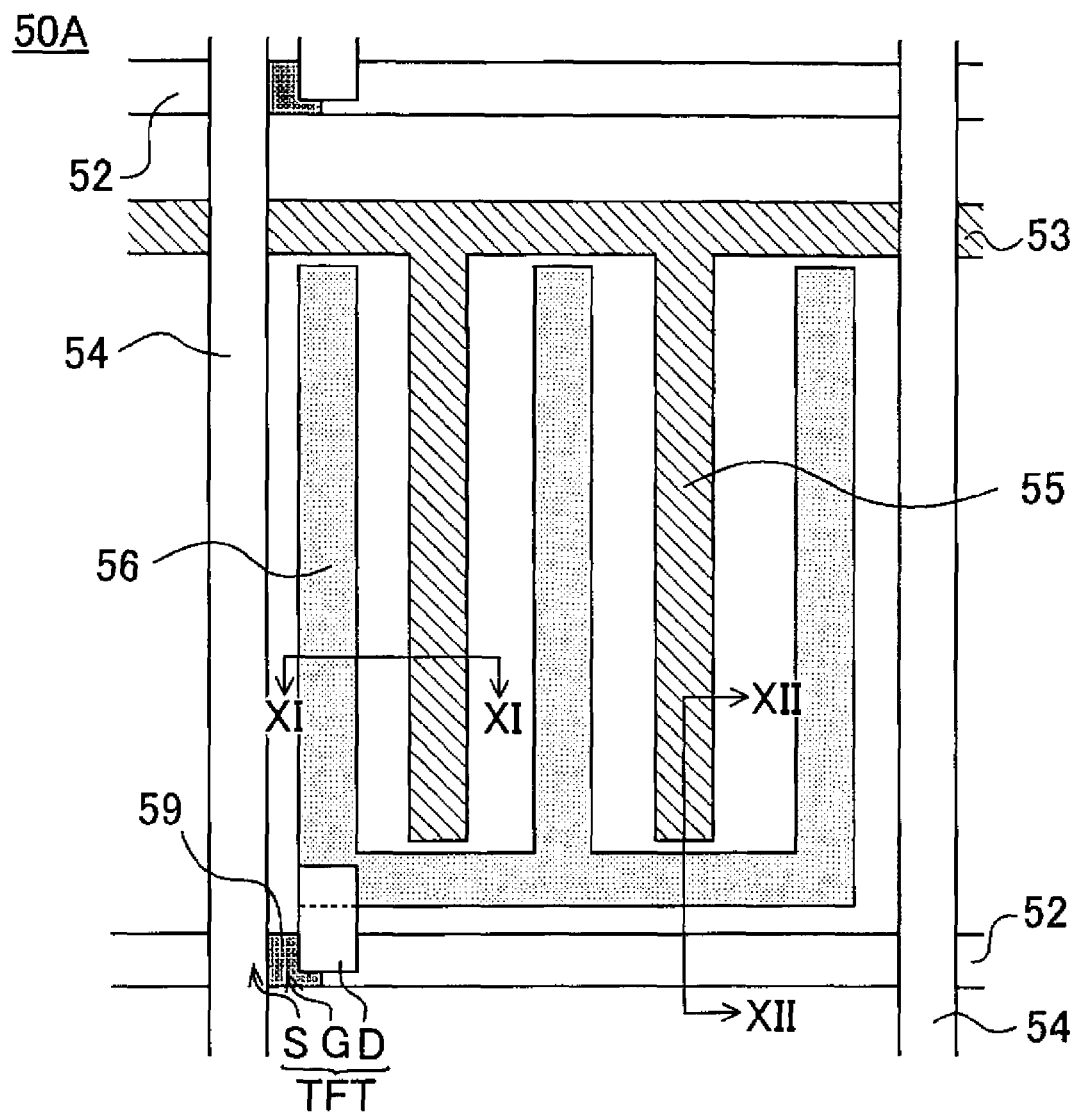
FIG. 10 is a schematic plan view of a single pixel portion of an IPS mode liquid crystal display panel of the related art.
Figure 11:
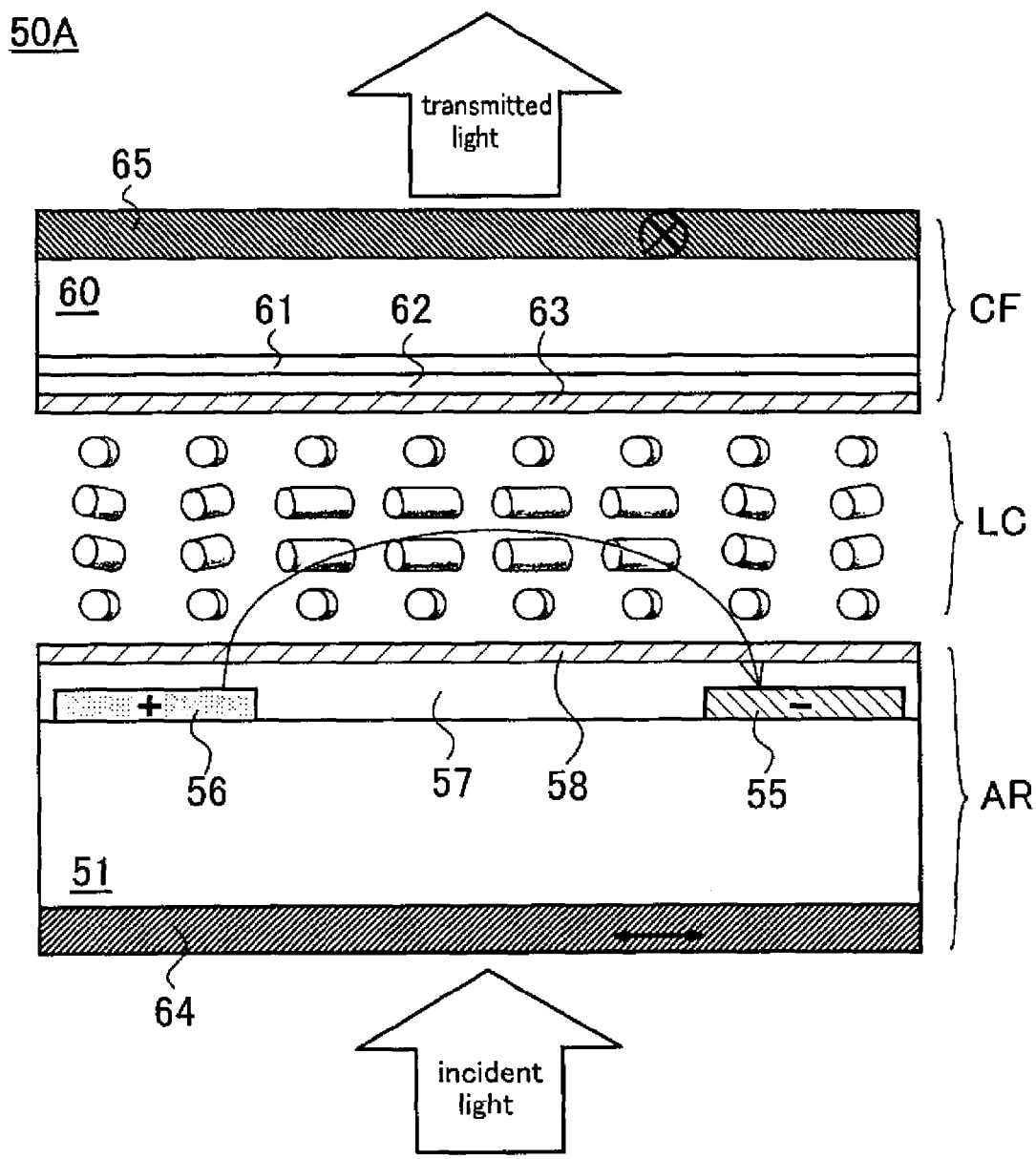
FIG. 11 is a cross-sectional view along line XI-XI in FIG. 10.
Figure 12:
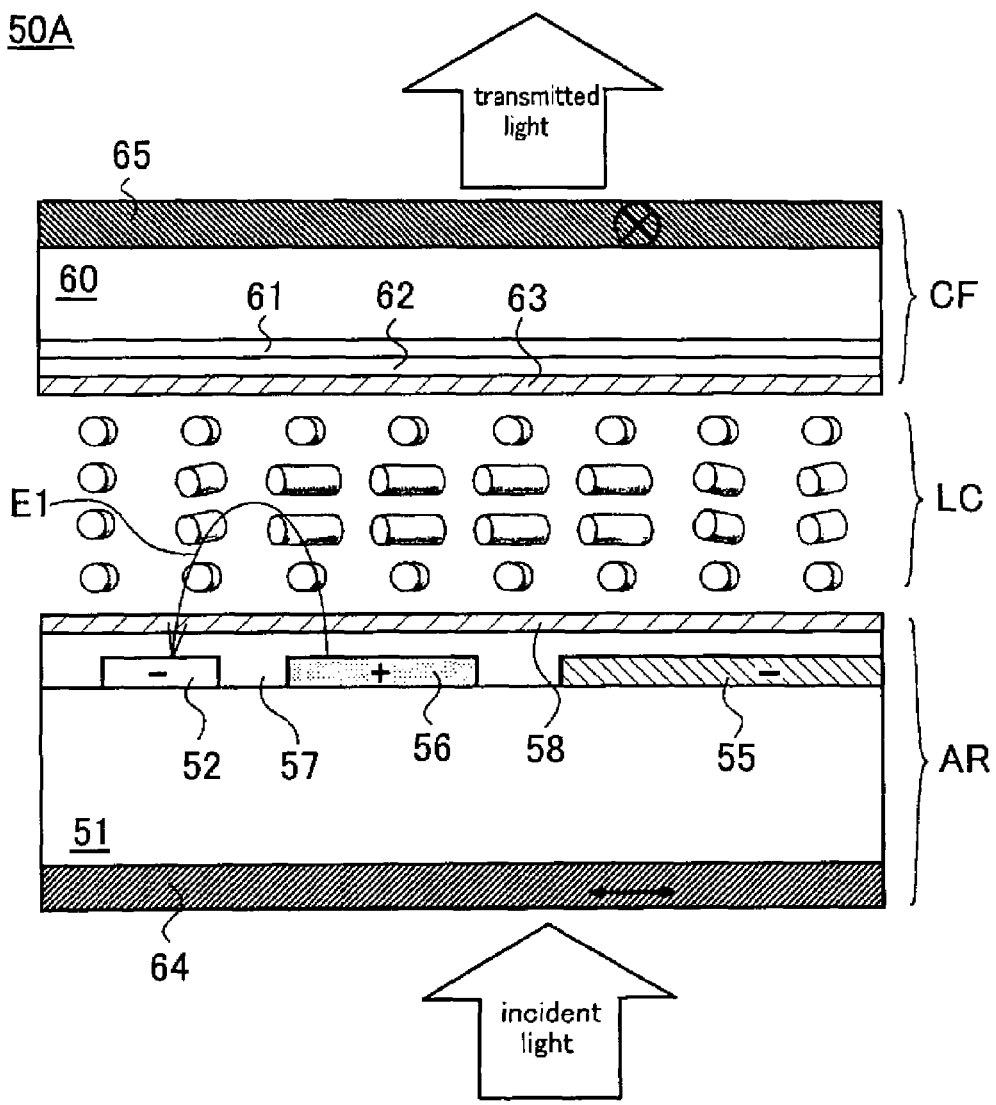
FIG. 12 is a cross-sectional view along line XII-XII in FIG. 10.
Figure 13:
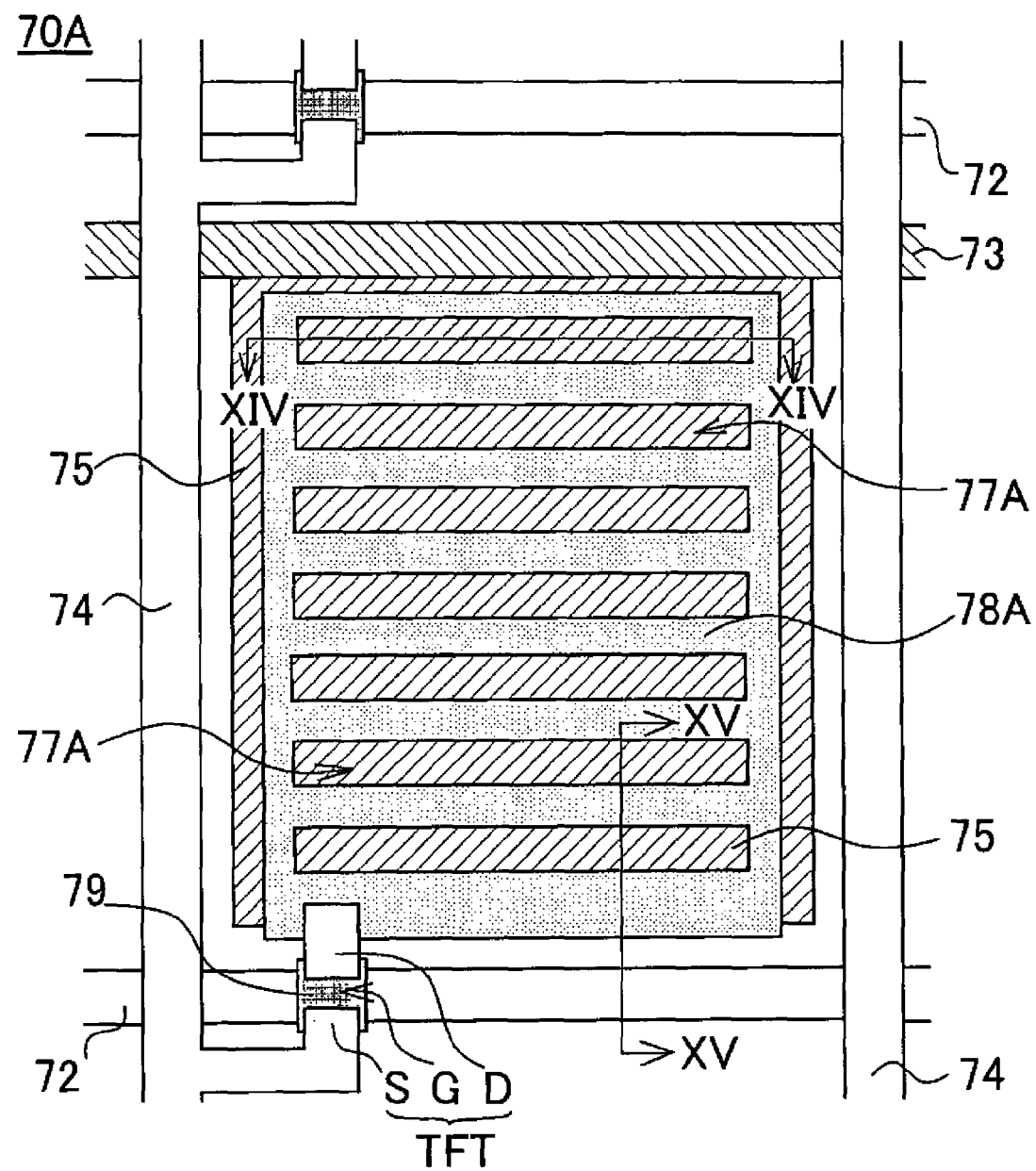
FIG. 13 is a schematic plan view of a single pixel portion of an FFS mode liquid crystal display panel of the related art.
Figure 14:
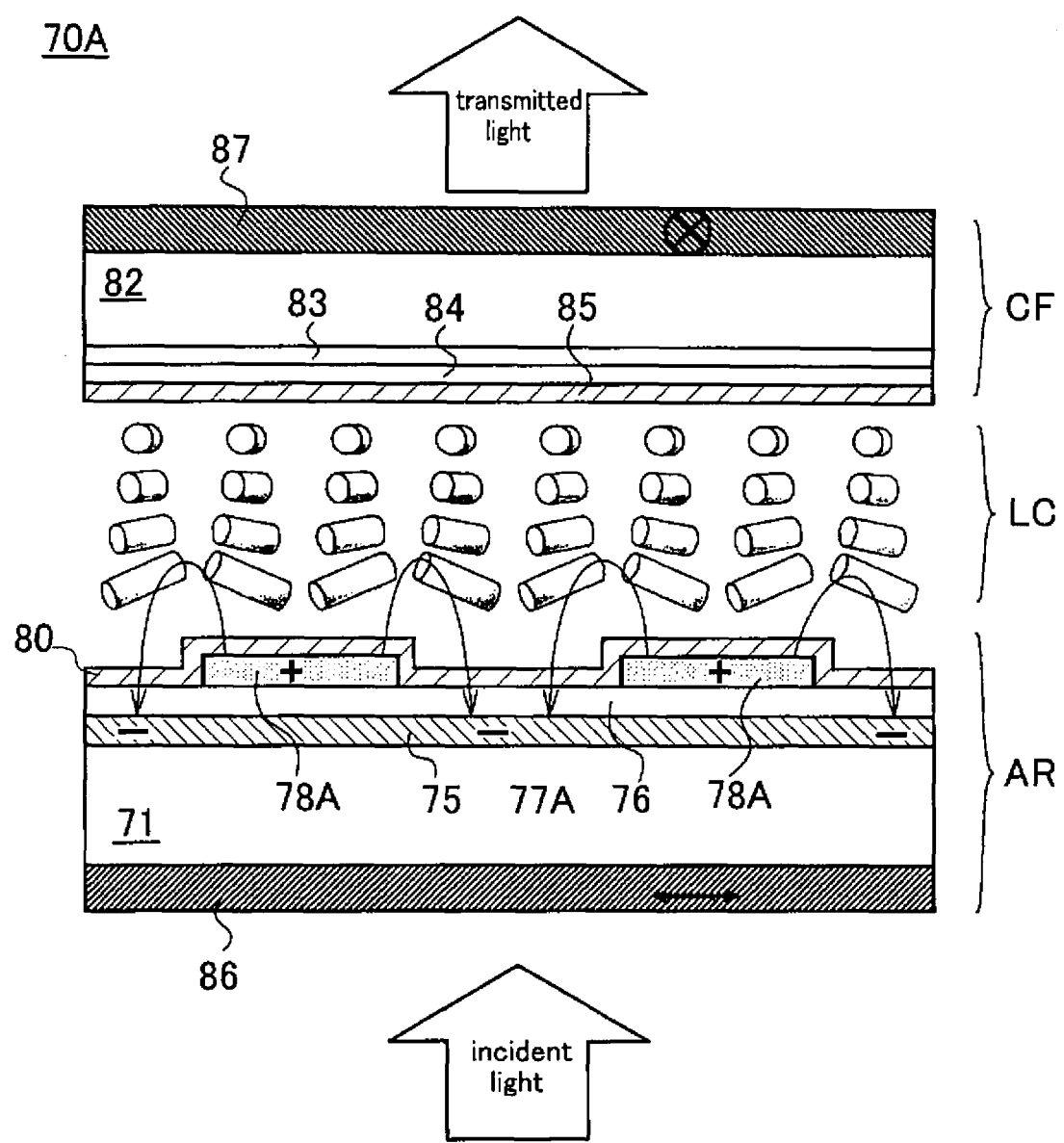
FIG. 14 is a cross-sectional view along line XIV-XIV in FIG. 13.
Figure 15:
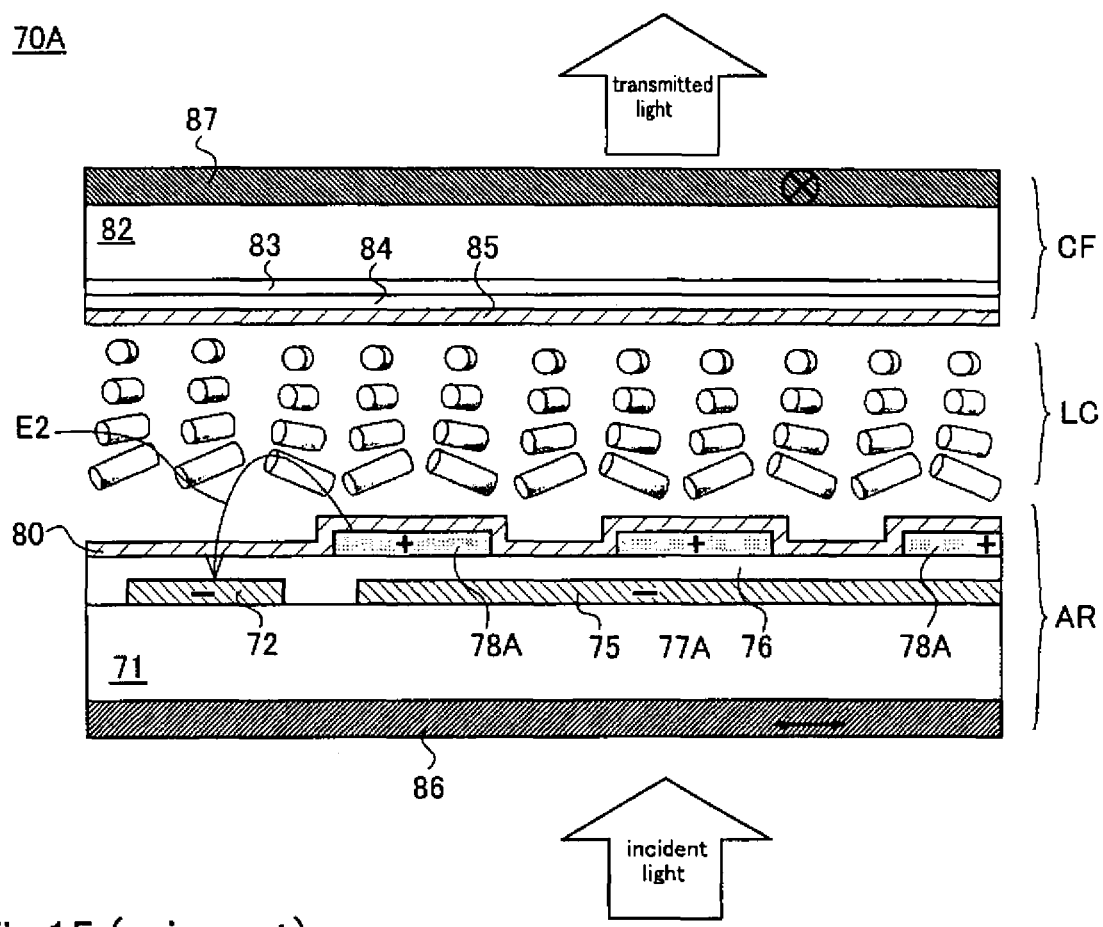
FIG. 15 is a cross-sectional view along line XV-XV in FIG. 13.
Figure 16:
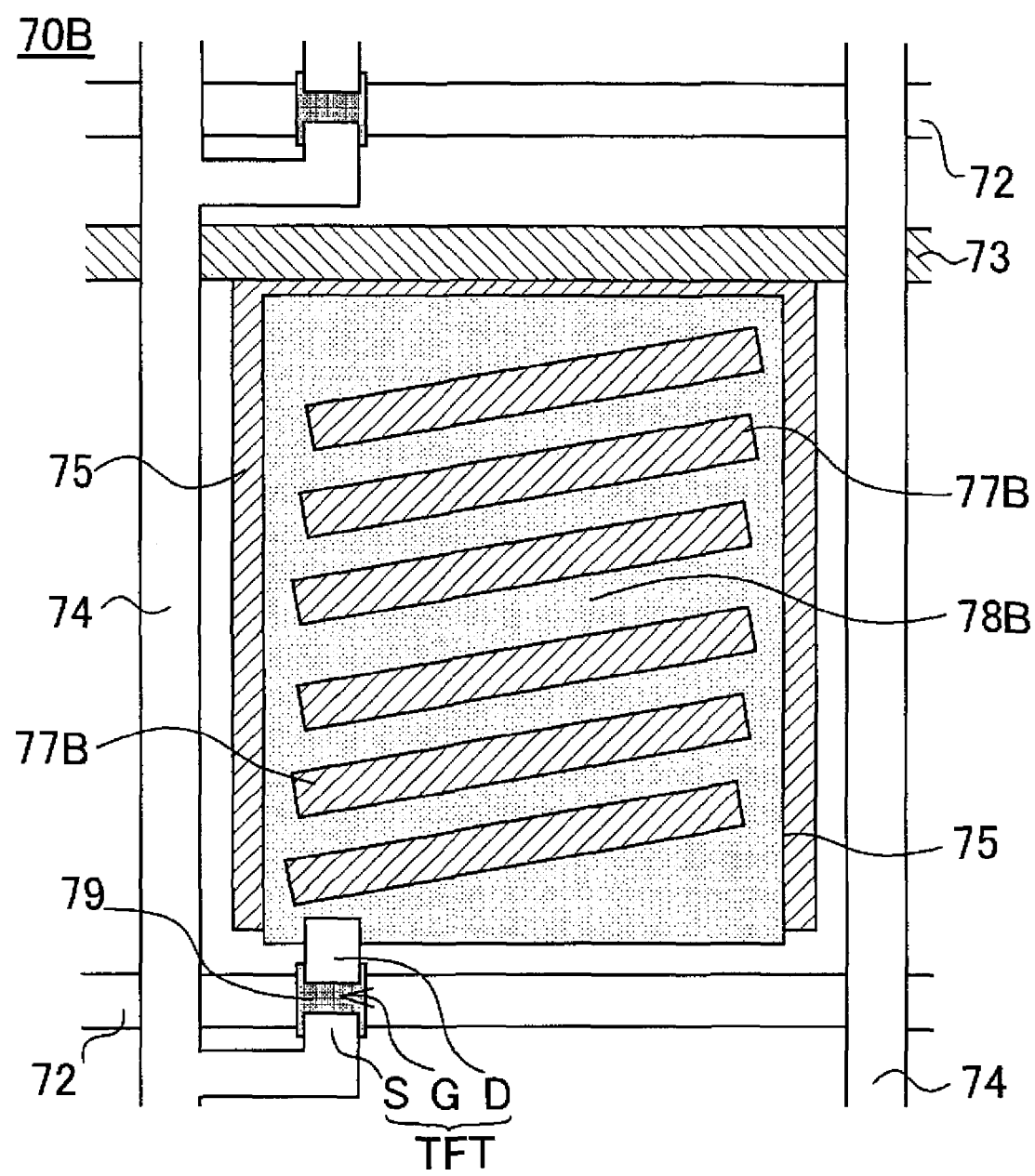
FIG. 16 is a schematic plan view of another FFS mode liquid crystal display panel of the related art.
Figure 19:
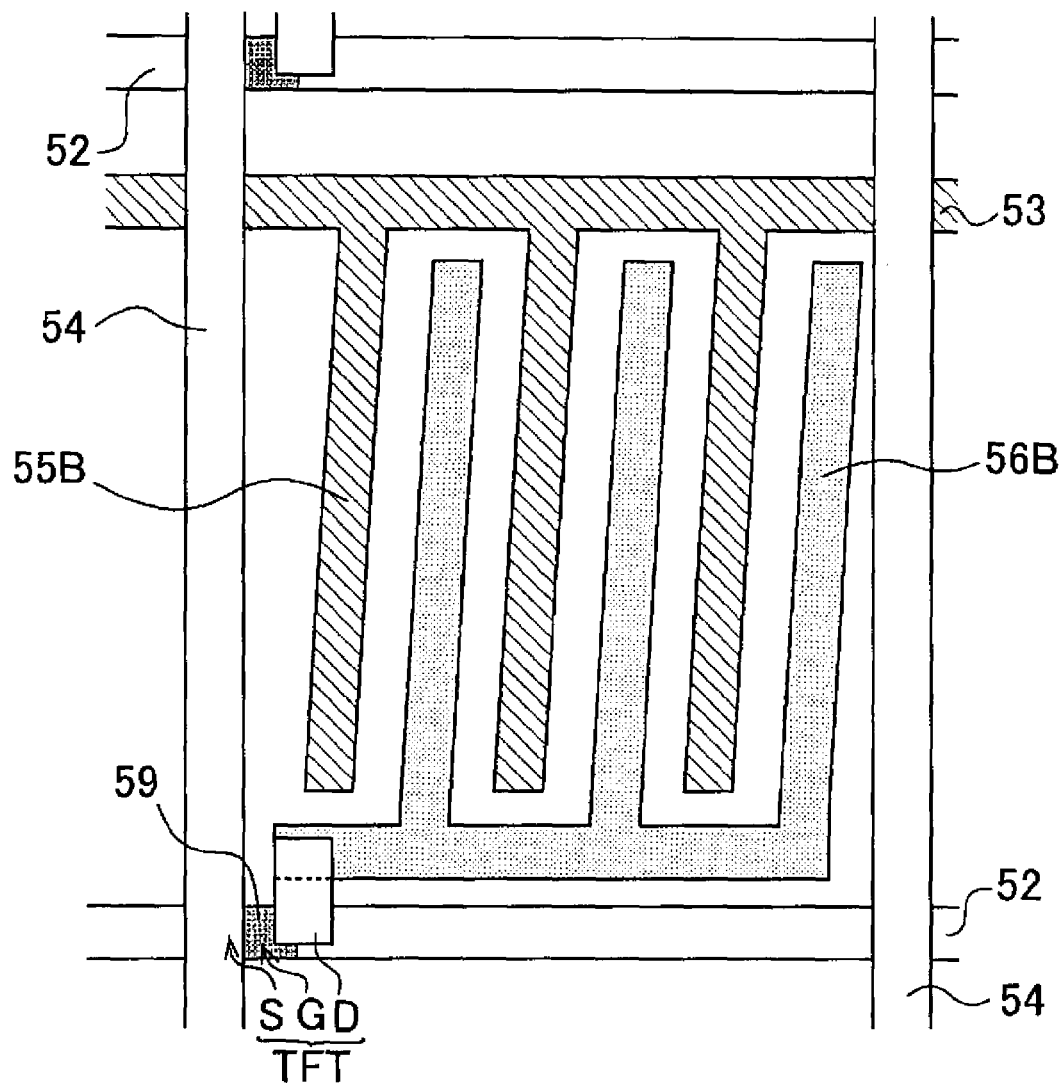
FIG. 19 is a schematic plan view of an IPS mode liquid crystal display panel corresponding to the item in FIG. 16.
Figure 20:
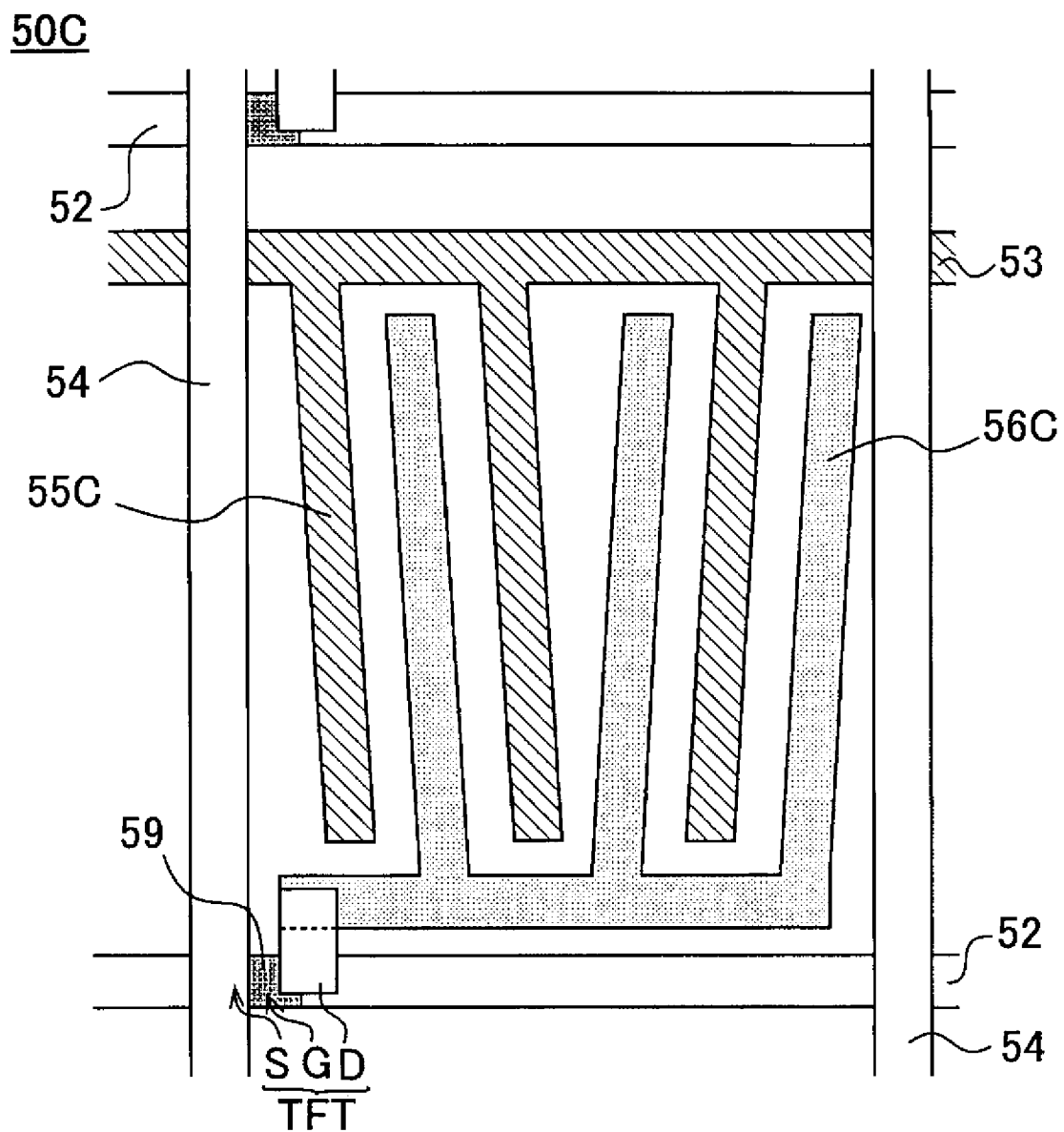
FIG. 20 is a schematic plan view of an IPS mode liquid crystal display panel corresponding to the item in FIG. 17.

In addition, the configuration of the FFS mode liquid crystal display panels 10A to 10D described in the first to fourth embodiments above—and in particular the configuration relating to the shield electrodes 22—can readily be adapted into an IPS mode liquid crystal display panel such as shown in FIGS. 10 to 12. To avoid duplication of description however, descriptions of the configurations of the present invention when adapted to an IPS mode liquid crystal display panel are omitted herein. Furthermore, it is plainly evident that when the present invention is adapted to IPS mode liquid crystal display panels, it will be possible, as in the related art IPS mode liquid crystal display panels 50B and 50C shown in FIGS. 19 and 20, to provide the pixel electrodes and common electrodes inclined at a slight angle to the alignment layer's rubbing direction, to arrange the pixel electrodes and common electrodes each to be inclined in a different extension direction, leftward or rightward, to the other, thereby producing dual domains, and to arrange the pixel electrodes and common electrodes in a delta layout.

What is claimed is:

1. A transverse field type liquid crystal display panel comprising:
   multiple scan lines and common wires provided in parallel;
   multiple signal lines provided in a direction crossing the scan lines;
   common electrodes and pixel electrodes formed in regions delimited by the scan lines and signal lines; and
   shield electrodes constituted of a conductive material being formed on a surface of an insulator lying over the scan lines,
   wherein the shield electrodes are electrically connected to the common electrodes, and
   wherein the pixel electrodes partially have cut-aways provided close to the shield electrodes and the shield electrodes are extended to above the insulator at the cut-aways and electrically connected to the common electrodes via contact holes provided in the cut-aways.

2. The transverse field type liquid crystal display panel according to claim 1, wherein the shield electrodes are electrically connected to the signal lines.

3. The transverse field type liquid crystal display panel according to claim 2, wherein the shield electrodes are extended over the surface of the insulator over the scan lines as far as the intersections of the scan lines and signal lines, and are electrically connected to the signal lines via contact holes provided at the intersections.

4. The transverse field type liquid crystal display panel according to claim 1, wherein the shield electrodes are formed from the same material as the pixel electrodes.

5. The transverse field type liquid crystal display panel according to claim 1, wherein the common electrodes and pixel electrodes are provided so as to be inclined relative to the scan lines or signal lines.

6. The transverse field type liquid crystal display panel according to claim 5, wherein the common electrodes and pixel electrodes inside the regions delimited by the scan lines and signal lines are provided so as each to be inclined in a different extension direction, leftward or rightward, to the other.

7. The transverse field type liquid crystal display panel according to claim 1, wherein the common electrodes are formed so as to cover the regions delimited by the scan lines and signal lines, and the pixel electrodes are formed over the common electrodes, with an insulator interposed, and provided with multiple slits that are parallel to one another.

8. The transverse field type liquid crystal display panel according to claim 7, wherein the multiple slits are provided so as to be inclined relative to the scan lines or the signal lines.

9. The transverse field type liquid crystal display panel according to claim 8, wherein the common wires are provided between the multiple scan lines, and the multiple slits are provided so as to be inclined in different directions to each other on the two sides of the common wires.

10. The transverse field type liquid crystal display panel according to claim 9, wherein the numbers of slits provided on each of the two sides of the common wires are equal.

11. The transverse field type liquid crystal display panel according to claim 9, wherein the end portions of those slits on the two sides of each common wire that are closest thereto are joined above the common wire.

12. The transverse field type liquid crystal display panel according to claim 1, wherein TFTs (thin film transistors) that serve as switching elements are provided over the scan lines, close to points where the signal lines intersect therewith, and the shield electrodes are provided so as to cover over the scan lines except for the surfaces of the TFTs.

13. The transverse field type liquid crystal display panel according to claim 1, wherein the signal lines are provided in a crank shape in a direction orthogonal to the scan lines, and the multiple common electrodes and pixel electrodes are arranged in a delta layout.

14. A transverse field type liquid crystal display panel, comprising:
    multiple scan lines and common wires provided in parallel;
    multiple signal lines provided in a direction crossing the scan lines;
    common electrodes and pixel electrodes formed in regions delimited by the scan lines and signal lines; and
    shield electrodes constituted of a conductive material being formed on a surface of an insulator lying over the scan lines,
    wherein the pixel electrodes partially have cut-aways provided adjacent to the two sides of the scan lines, and the shield electrodes are extended to above the surface of the insulator over the cut-aways and are electrically connected to each of the common electrodes located on the two sides of the scan lines.

15. The transverse field type liquid crystal display panel according to claim 14, wherein the shield electrodes cover half or more of each scan line.

* * * * *